(12) United States Patent
Dybdal et al.

(10) Patent No.: US 8,259,857 B2
(45) Date of Patent: Sep. 4, 2012

(54) METHODS AND SYSTEMS FOR INCREASED COMMUNICATION THROUGHPUT

(75) Inventors: Robert B. Dybdal, Palos Verdes Estates, CA (US); Flavio Lorenzelli, Los Angeles, CA (US); Samuel J. Curry, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 13/156,128

(22) Filed: Jun. 8, 2011

(65) Prior Publication Data

US 2011/0268168 A1 Nov. 3, 2011

Related U.S. Application Data

(63) Continuation-in-part of application No. 12/635,670, filed on Dec. 10, 2009.

(51) Int. Cl.
*H04L 27/00* (2006.01)
*H04L 27/06* (2006.01)
*H04L 27/22* (2006.01)

(52) U.S. Cl. ............... 375/316; 375/320; 375/329

(58) Field of Classification Search ......... 375/260–261, 375/268, 273, 279, 316, 320, 324, 340–341, 375/346–348; 455/296, 303; 714/242, 795
See application file for complete search history.

(56) References Cited

U.S. PATENT DOCUMENTS

| | | | |
|---|---|---|---|
| 6,026,121 A | 2/2000 | Sadjadpour | |
| 6,910,177 B2 | 6/2005 | Cox | |
| 7,330,801 B2 | 2/2008 | Goldberg et al. | |
| 7,558,330 B2 * | 7/2009 | Hafeez | 375/267 |
| 7,873,113 B2 * | 1/2011 | Takano et al. | 375/267 |
| 7,893,872 B2 * | 2/2011 | Kostanic | 342/378 |
| 8,077,758 B2 * | 12/2011 | Goldberg | 375/148 |
| 2005/0105644 A1 * | 5/2005 | Baxter et al. | 375/316 |
| 2009/0185635 A1 * | 7/2009 | Okello | 375/267 |
| 2011/0038436 A1 * | 2/2011 | Kim et al. | 375/260 |

OTHER PUBLICATIONS

Chen et al., Layered Turbo Space-Time Coded MIMO-OFDM Systems for Time Varying Channels, Dec. 1-5, 2003, Global Telecommunications Conference, 2003. Globecom '03. IEEE, vol. 4, pp. 1831-1836.*

Gallo et al., A BEM-Based Algorithm for Soft-In Soft-Output Detection of Co-Channel Signals, Sep. 2004, IEEE Transactions on Wireless Communications, vol. 3, No. 5, pp. 1533-1542.*

Ruegg et al., Iterative SIC Receiver Scheme for Non-Orthogonally Superimposed Signals on Top of OFDMA, Sep. 26-30, 2010, Personal Indoor and Mobile Radio Communications (PIMRC) 2010 IEEE 21st International Symposium on, pp. 156-161.*

(Continued)

*Primary Examiner* — Lawrence B Williams
(74) *Attorney, Agent, or Firm* — K & L Gates LLP

(57) ABSTRACT

Systems and methods for increasing communication throughput by superimposing multiple signal components in the same bandwidth are disclosed. Cochannel interference is reduced by using signal separation algorithms. The signal separation algorithms may use both a priori information about the superimposed signals and measured channel parameters. In addition, error correction encoding and interleaving may be used to reduce signal power and obviate the need for ideal signal separation.

26 Claims, 17 Drawing Sheets

OTHER PUBLICATIONS

Abe et al., Performance Evaluation of a Space-time Turbo Equalizer in Frequency Selective MIMO Channels Using Field Measurement Data, 2001, MIMO: Communications Systems From Concept to Implementation (Ref. No. 2001/175), IEEE Seminar on, pp. 21/1-21/5.*

Cardoso, J.F., "Blind Signal Separation: Statistical Principles," Proc. IEEE, Oct. 1998, pp. 2009-2025.

Albera, L., et al., "ICAR: A tool for Blind Source Separation Using Fourth-Order Statistics Only," IEEE Transactions on Signal Processing, Oct. 2005, pp. 3633-3643.

Rabiner, L.R., "A Tutorial on Hidden Markov Models and Selected Applications in Speech Recognition," Feb. 1989, Proc. IEEE, vol. 77, pp. 257-286.

Bahl, L.R., et al., "Optimal Decoding of Linear Codes for Minimizing Symbol Error Rate," IEEE Tr. IT, Mar. 1974, vol. 20, pp. 284-287.

Verdú, S., "Optimum Multiuser Detection," Cambridge Univ. Press, 1998, Chapter 4, pp. 154-233.

Koetter, R., et al., "Turbo Equalization," Jan. 2004, IEEE SP Magazine, pp. 67-80.

Tuechler, M., et al., "Turbo Equalization: Principles and New Results," May 2002, IEEE Tr. Comm., 50(5): 754-767.

Carbonell!, C., et al. "Sparse Channel Estimation with Zero Tap Detection," Department of Information Engineering, University of Pisa, May 2007.

Lee, J., et al. Joint Maximum Likelihood Estimation of Channel and Preamble Sequence for WiMAX Systems, IEEE Transactions on Wireless Communications, Nov. 2008, vol. 7, No. 11.

Loeliger, H., "An Introduction to Factor Graphs," IEEE Signal Processing Magazine, Jan. 2004, pp. 28-41.

Colavolpe, G., et al., "On the Application of Factor Graphs and the Sum-Product Algorithm to ISI Channels," IEEE Transactions on Communications, May 2005, vol. 53, pp. 818-825.

Langston, C., "All About Modulation, Part I", Inuitive Guide to Principles of Communications, 2002, revised Dec. 2005, pp. 1-48.

* cited by examiner

Channels    h1=[h10, h11] = [  1    0.5   ]
            h2=[h20, h21] = [  0.4  -0.3  ]

metric @k=metric@k-1 + (expected output - received)²
expected output = b1(h10) + s1(h11) + b2(h20) + x2(h21)

| Departing Branch | | Arriving Branch | | Time 0 | Time 1 | | | Time 2 | | |
|---|---|---|---|---|---|---|---|---|---|---|
| State s1 | State s1 | Symbol b1 | Symbol b1 | Metric | Arriving Expected Output | Metric | Survivors | Arriving Expected Output | Metric | Survivors |
| 1 | 1 | 1 | 1 | 0 | 1.6 | 0.6724 | 0.0324 | 1.6 | 4.9165 | 1.8005 |
| 1 | 1 | 1 | 1 | 0 | 2.2 | 2.0164 | 0.0004 | 2.2 | 7.8965 | 0.5045 |
| -1 | 1 | 1 | 1 | 0 | 0.6 | 0.0324 | 0.3364 | 0.6 | 1.8005 | 0.0765 |
| -1 | 1 | 1 | 1 | 0 | 1.2 | 0.1764 | 1.9044 | 1.2 | 5.1805 | 0.0005 |
| 1 | 1 | -1 | 1 | 0 | 0.8 | 0.0004 | 0.0324 | 0.8 | 2.0205 | 1.8005 |
| 1 | 1 | -1 | 1 | 0 | 1.4 | 0.3844 | 0.0004 | 1.4 | 4.0405 | 0.5045 |
| -1 | 1 | -1 | 1 | 0 | -0.2 | 0.9604 | 0.3364 | -0.2 | 0.5045 | 0.0765 |
| -1 | 1 | -1 | 1 | 0 | 0.4 | 0.1444 | 1.9044 | 0.4 | 2.9245 | 0.0005 |
| 1 | -1 | 1 | -1 | 0 | -0.4 | 1.3924 | 0.0324 | -0.4 | 0.0765 | 1.8005 |
| 1 | -1 | 1 | -1 | 0 | 0.2 | 0.3364 | 0.0004 | 0.2 | 0.6565 | 0.5045 |
| -1 | -1 | 1 | -1 | 0 | -1.4 | 4.7524 | 0.3364 | -1.4 | 0.9805 | 0.0765 |
| -1 | -1 | 1 | -1 | 0 | -0.8 | 2.4964 | 1.9044 | -0.8 | 1.9405 | 0.0005 |
| 1 | -1 | -1 | -1 | 0 | -1.2 | 3.9204 | 0.0324 | -1.2 | 0.3805 | 1.8005 |
| 1 | -1 | -1 | -1 | 0 | -0.6 | 1.9044 | 0.0004 | -0.6 | 0.0005 | 0.5045 |
| -1 | -1 | -1 | -1 | 0 | -2.2 | 8.8804 | 0.3364 | -2.2 | 2.8845 | 0.0765 |
| -1 | -1 | -1 | -1 | 0 | -1.6 | 5.6644 | 1.9044 | -1.6 | 2.8845 | 0.0005 |
| | | | | Received | 0.78 | | | -0.61 | | |

FIG. 7A

| Departing Branch | | Arriving Branch | | Time 0 | Time 3 | | | | Time 4 | | |
|---|---|---|---|---|---|---|---|---|---|---|---|
| State s1 | State s1 | Symbol b1 | Symbol b1 | Metric | Arriving Expected Output | Metric | | Survivors | Arriving Expected Output | Metric | |
| 1 | 1 | 1 | 1 | 0 | 1.6 | 11.8494 | | 0.0324 | 1.6 | 6.1778 | |
| 1 | -1 | 1 | 1 | 0 | 2.2 | 14.7174 | | 0.0004 | 2.2 | 5.1218 | |
| -1 | 1 | 1 | 1 | 0 | 0.6 | 4.7854 | | 0.0364 | 0.6 | 0.1378 | |
| -1 | -1 | 1 | 1 | 0 | 1.2 | 7.6734 | | 1.9044 | 1.2 | 0.6098 | |
| 1 | 1 | -1 | 1 | 0 | 0.8 | 7.4174 | | 4.7854 | 0.8 | 4.9298 | |
| 1 | -1 | -1 | 1 | 0 | 1.4 | 9.3254 | | 1.9534 | 1.4 | 2.9138 | |
| -1 | 1 | -1 | 1 | 0 | -0.2 | 1.9534 | | 0.1054 | -0.2 | 0.4898 | |
| -1 | -1 | -1 | 1 | 0 | 0.4 | 3.8814 | | 0.0014 | 0.4 | 0.0018 | |
| 1 | 1 | 1 | -1 | 0 | -0.4 | 3.1694 | | 4.7854 | -0.4 | 5.4578 | |
| 1 | -1 | 1 | -1 | 0 | 0.2 | 3.6374 | | 1.9534 | 0.2 | 2.0018 | |
| -1 | 1 | 1 | -1 | 0 | -1.4 | 0.1054 | | 0.1054 | -1.4 | 3.4178 | |
| -1 | -1 | 1 | -1 | 0 | -0.8 | 0.5934 | | 0.0014 | -0.8 | 1.4898 | |
| 1 | 1 | -1 | -1 | 0 | -1.2 | 1.9374 | | 4.7854 | -1.2 | 7.4098 | |
| 1 | -1 | -1 | -1 | 0 | -0.6 | 1.4454 | | 1.9534 | -0.6 | 2.9938 | |
| -1 | 1 | -1 | -1 | 0 | -2.2 | 0.4734 | | 0.1054 | -2.2 | 6.9698 | |
| -1 | -1 | -1 | -1 | 0 | -1.6 | 0.0014 | | 0.0014 | -1.6 | 4.0818 | |
| Received | | | | | -1.57 | | | | 0.42 | | |

FIG. 7B

METHODS AND SYSTEMS FOR INCREASED COMMUNICATION THROUGHPUT

CROSS REFERENCES TO RELATED APPLICATIONS

This application is a continuation-in-part of U.S. patent application Ser. No. 12/635,670 filed on Dec. 10, 2009, which is incorporated herein by reference in its entirety.

STATEMENT OF GOVERNMENT INTEREST

This invention was made with government support under Contract No. FA8802-09-C-0001 awarded by the Department of the Air Force. The government has certain rights in the invention.

BACKGROUND

Various technical and economic factors have led to a desire to increase communication throughput within a given frequency bandwidth. Several techniques have been developed. One approach, for example, utilizes higher order signal modulation formats such as 8 Phase Shift Keying (8PSK) and Quadrature Amplitude Modulation (QAM) to obtain greater bandwidth efficiency. Such modulation formats maximize the data transmitted in a given bandwidth, resulting in increased bandwidth efficiency. These modulation formats are often characterized by the number of bits per Hertz, e.g., Binary Phase Shift Keying (BPSK) has ½ bit/Hz. Quadrature Phase Shift Keying (QPSK) has 1 bit/Hz, and 8PSK has 1.5 bits/Hz, and 16 QAM has 2 bits/Hz. For example, for a given bandwidth 16 QAM can communicate 4 times more bits than BPSK. One limitation of higher order modulation is increased stringency on transmitter linearity resulting in transmitter power backoff requirements that reduce signal power for receiver detection and prompt the development of linearizers to allow operation closer to transmitter saturated output levels.

Other techniques for maximizing bandwidth efficiency and increasing communication throughput focus on maintaining isolation of independent data, for example, by polarization, geographic location, or frequency sub-band. Polarization techniques utilize orthogonally polarized antennas. Each orthogonal polarization communicates independent data streams to double the throughput. Sufficient isolation afforded by orthogonal polarization allows communication without cochannel interference but imposes stringent antenna design requirements to achieve and maintain orthogonal polarizations. According to geographic or spatial techniques, coverage areas served by antennas are broken into spatially isolated regions. Different spatially isolated antenna regions may re-use the same bandwidth to communicate independent data streams, thus, increasing communication throughput. In this case, stringent requirements on antenna sidelobe levels are necessary to avoid mutual interference. One frequency-based technique is frequency division multiple access, or FDMA. Each individual user in a FDMA scheme is assigned one or more subbands, but sufficient frequency separation between adjacent subbands is required to avoid mutual interference. All of these isolation-based techniques increase data throughput, but impose stringent isolation requirements that are achieved by passive design techniques so that communication to individual users is not degraded, for example, due to co-channel interference (CCI) or other interference.

Other techniques for maximizing bandwidth efficiency and increasing communication throughput use adaptive subtraction to allow two users to superimpose data streams onto the same bandwidth resulting in a composite signal. Upon reception of the composite signal containing both data streams, each user adaptively subtracts a time delayed adjusted replica of their respectively transmitted signal to receive the other user's data stream. In this way, the communication throughput is doubled. Commercial embodiments of this technique exist including, for example, AST's DOUBLETALK and ViaSat's PCMA (Paired Carrier Multiple Access). Such techniques allow reuse of the same frequency bandwidth, but are limited in that they require that uplink signals originate and terminate at the same users' locations so that an adaptively subtracted time delay of one user's signal can be used to obtain the other user's signal. Further, the composite signal cannot be broadcast to multiple receiving sites because signal replicas must be available at all users' sites to perform the required adaptive subtraction. (See FIG. 8).

Yet other techniques for maximizing bandwidth efficiency and increasing communication throughput utilize signal separation to separate data streams whose spectral content (or bandwidth) partially or completely overlap (e.g., blind signal separation). These blind signal separation techniques separate superimposed signals based on, for example, spectral differences or statistical independence between data streams. Blind signal separation techniques have been applied to a variety of problems, including communications, geophysical exploration, image processing and biological applications. Examples of signal separation techniques include maximum likelihood techniques, maximum a priori techniques, and higher order statistical approaches. Such signal separation techniques can be very useful, but are most effective only when the signals or streams to be separated exhibit the statistical independence and/or spectral differences that a selected signal separation technique is configured to detect.

SUMMARY

Various embodiments are directed to systems and methods that use signal processing techniques to allow the frequency bandwidth to be shared among two or more independent data streams as a means to increase communication throughput. These embodiments allow the separation of the independent data streams from a composite signal comprised of the multiple independent data streams negating what would normally be unacceptable levels of CCI or other interference for conventional receiving systems. In this way, multiple signal components may partially or completely share the same frequency bandwidth by applying signal separation techniques to obtain acceptable communication performance for each of the multiple signals. Such embodiments may provide an increase in communication throughput that is achieved by applying signal processing techniques to a composite signal to communicate multiple independent data streams without the constraint imposed by passive design techniques to isolate the individual signal components.

Various embodiments are directed to systems and methods for increasing the data throughput of a communications system by creating a composite signal in the spectral, spatial, or polarization domains comprised of multiple independent data streams having bandwidths that at least partially overlap. These signal processing embodiments include a signal separation algorithm to separate the multiple data streams, a channel estimator that utilizes a priori information and measurements of the channel parameters of the data streams, and a performance monitor that provides real time measures of signal separation performance.

In various embodiments, multiple digitally modulated signals may be simultaneously transmitted in overlapping frequency bands by a common transmission medium. The transmitted signals may differ in at least one of carrier frequency, carrier phase, delay and impulse response, and are received as a composite signal. A channel estimator is configured to determine the channel parameters of the individual signals. The receiver has knowledge of the characteristics of the individual signal components that may include modulation format, signal block characteristics such as preambles, error correction and interleaving descriptions, bit pulse shapes, nominal code and bit rates, and other descriptors of the signal components. The channel estimator uses this information to perform measurements of the composite signals to ascertain channel parameters and may include fast Fourier transform (FFT) techniques to determine carrier frequency differences of the multiple signal components and phase and delay lock loop techniques to determine bit timing and code phase differences of the multiple signal components. These measurements define the channel parameters of the individual signals allowing construction of matched filter responses of the components, for example, and the measurements may be continuously performed to dynamically address any drift in the channel parameters. The information furnished by the channel estimator is incorporated into a signal separation algorithm. A performance monitor assesses the signal separation performance to provide a real time indication to system operators. The performance monitor may assess the stability of the channel parameters, compare the sum of the individual separated signal powers with the composite signal power to determine if matched filter responses have been achieved by the signal separation, or in the case of recursive signal separation algorithms, examine the consistency of results of sequential iterations.

Various embodiments may be used for the signal separation algorithm. Several formulations are conventionally used and are described, for example, as blind signal separation algorithms that are based on maximum likelihood, maximum a posteriori, maximum entropy, and statistical independence of component signals formulations. These signal separation techniques are referred to as "blind" because these algorithms do not exploit detailed characteristics of the channel parameters. The signal separation algorithms used in the various embodiments differ from the conventional blind signal separation algorithms because a priori signal descriptions and measurements of channel parameters are used in the separation process. Consequently, the various embodiments described herein use what will be referred to as "signal separation algorithms."

These embodiments also may use error correction coding and interleaving modulation techniques to reduce the signal power needed for reliable detection and to correct errors incurred in time periods where channel parameter alignments challenge separation so that ideal signal separation is not required for reliable signal reception.

Additional features and advantages are described herein, and will be apparent from the following Detailed Description and the figures.

BRIEF DESCRIPTION OF THE FIGURES

FIGS. 7A and 7B show calculations for a trellis of one embodiment of the signal separator of FIG. 1.

DETAILED DESCRIPTION

Figure 1:
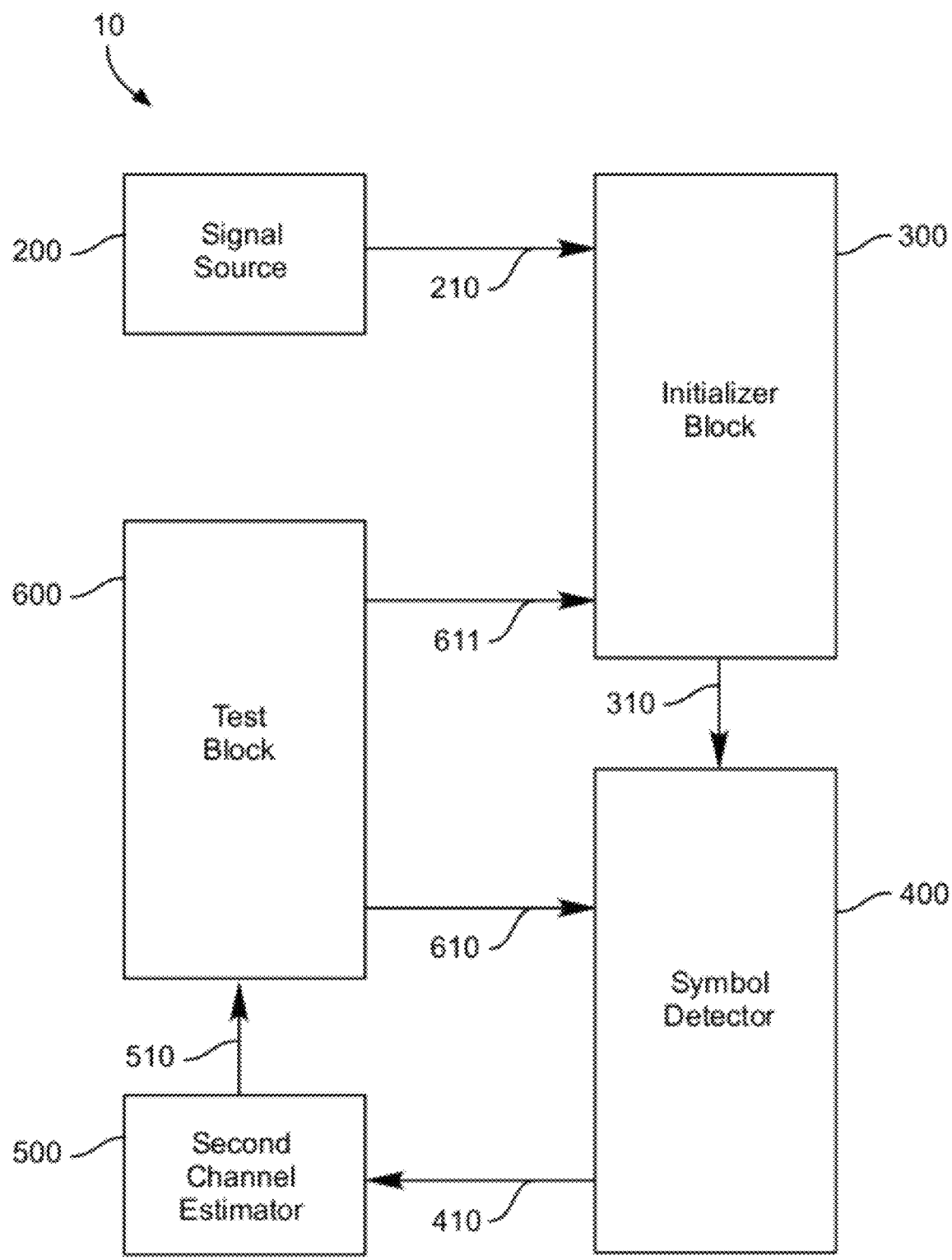
FIG. 1 is a block diagram of one embodiment of a signal separator.

Various embodiments are directed to systems and methods for separating multiple (e.g., two or more) independent data streams having overlapping frequency bandwidths. These systems and methods may be used to increase data throughput by allowing a single bandwidth to be utilized by multiple data streams. For example, when first and second data streams fully or partially occupy the same frequency bandwidth, they may be received as a composite input signal. The signal levels of the first and second data streams may have comparable or disparate values. Various embodiments may be directed to separating a composite input signal to reconstruct the first and second data streams. Although many of the examples herein describe separating first and second data streams from a composite input signal, it will be appreciated that the techniques described herein may be used to separate an arbitrary number of data streams having partially or completely overlapping frequency bandwidths.

According to various embodiments, a channel estimator may utilize a priori information about the first and second data streams and, in some embodiments, measurements of the composite signal to determine the channel parameters of the first and second data streams. Results of the channel estimator may be utilized by a signal separation algorithm that may utilize statistical measures, as described herein, to provide multiple signal outputs (e.g., the first and second data streams). Any suitable signal separation algorithm may be used including, for example, algorithms based on joint maximum likelihood, maximum a posteriori, erasure, independent component analysis, etc. In various embodiments, these signal separation algorithms differ from blind signal separation techniques in that they may incorporate a priori information or measurement of signal channel parameters in their operation.

In some embodiments, the first and second data streams may utilize error correction techniques, such as error correction encoding and/or interleaving, to reduce the signal levels needed for acceptable communication performance, to compensate for randomly located signal separation errors, and to maintain communication performance during time periods of unfavorable channel parameter alignments. The signal processing utilized in the signal separation algorithm may also incorporate signal decoding and/or deinterleaving in order to produce the first and second data streams.

According to various embodiments, the first and second data streams may originate and/or terminate at different locations. In this way, parties at different geographic locations may transmit communications on the same bandwidth. Further, the composite signal may be communicated to multiple users and since signal replicas required for known adaptive subtraction techniques are not needed, the signal separation techniques may advantageously allow users to receive one or more signal components in the composite signal increasing communication flexibility. Also, various embodiments may be utilized in conjunction with other bandwidth-sharing techniques to improve efficiency. This may allow some mutual interference control constraints of the other bandwidth-sharing techniques which may be relaxed or eliminated. For example, the strict orthogonality requirements of polarization reuse techniques may be relaxed, adjacent frequency slots used in FDMA techniques may be allowed to overlap, and/or some spatial overlap of spatially separated signals may be allowed. The resulting mutual interference between data streams may be removed utilizing various embodiments of the signal separation techniques used herein.

Various embodiments may include a channel estimator and a detector for separating multiple signals from a single received signal. The channel estimator and detector may be useful for, inter alia, separating uncoordinated co-channel signals of comparable power from a single received signal impaired by one or more of intersymbol interference, mutual interference, and additive noise.

FIG. 1 shows one embodiment of a signal separator receiving a signal from a signal source in accordance with the present application 10. A symbol detector 400 may be coupled with each of a signal source 200, an initializer block 300 and a test block 600. A second channel estimator 500 may be similarly coupled with the symbol detector and the test block. As used herein, coupled means directly or indirectly connected by a suitable means known to persons of ordinary skill in the art, such as wired, wireless, optical, and other known tangible and intangible connections.

Signals or information derived from the signal source 200 may be passed to the initialization block from a signal source output 210 and one or more outputs 310 of the initialization block 300 may be coupled for signal communication to the symbol detector 400. As used herein, passed means directly or indirectly transported via a suitable means known to persons of ordinary skill in the art such as by wired, wireless, optical and other known tangible and intangible transport means. Symbols detected in the symbol detector 400 may be passed to the second channel estimator from a symbol detector output 410. Channel estimates or information derived from the second channel estimator may then be passed to the test block 600 from a second channel estimator output 510. Symbols or information derived from the test block 600 may be passed to the symbol detector 400 from a first output of the test block 610. Symbols or information derived from the test block 600 may also be passed to the initializer block 300 from a second output 611 of the test block.

Figure 2:
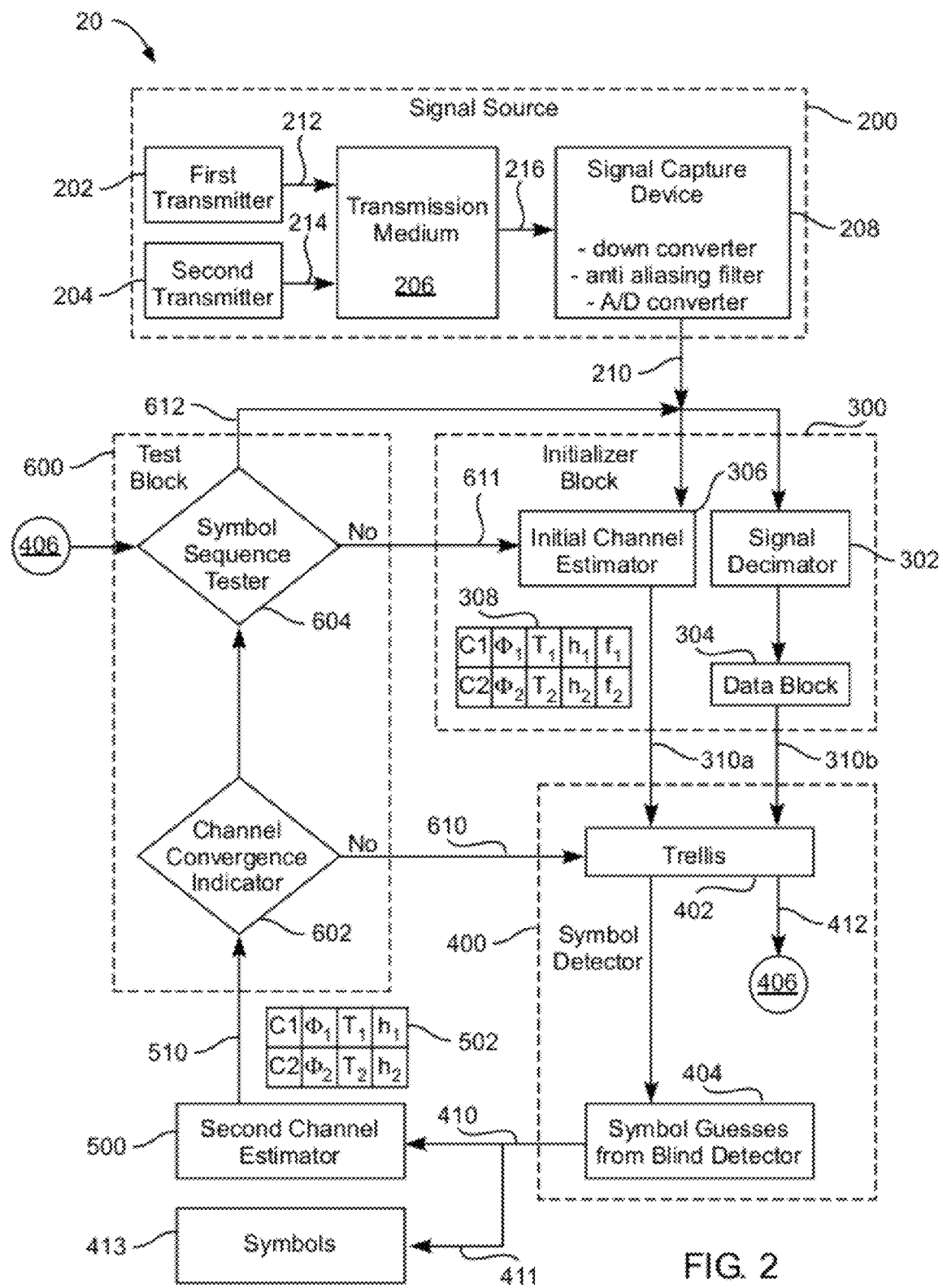
FIG. 2 is a block diagram of one embodiment of the signal separator of FIG. 1.

FIG. 2 shows additional details 20 of the signal separator of FIG. 1. Signal source 200 may include a plurality of transmitters 202, 204 generating respective output signals Signal 1 (212), and Signal 2 (214). While some examples described herein assume the separation of two signals, it will be appreciated that various embodiments may be applicable to separating more than two signals embedded in a single received signal. Signals 1 and 2 may be transported using a common transmission means or medium 206 such as a wired, wireless, light conducting, and other known tangible or intangible media. A signal capture device 208 of the signal source such as a radio frequency receiver may receive a single signal 216 that may include information from each of the transmitted signals.

Figure 3:
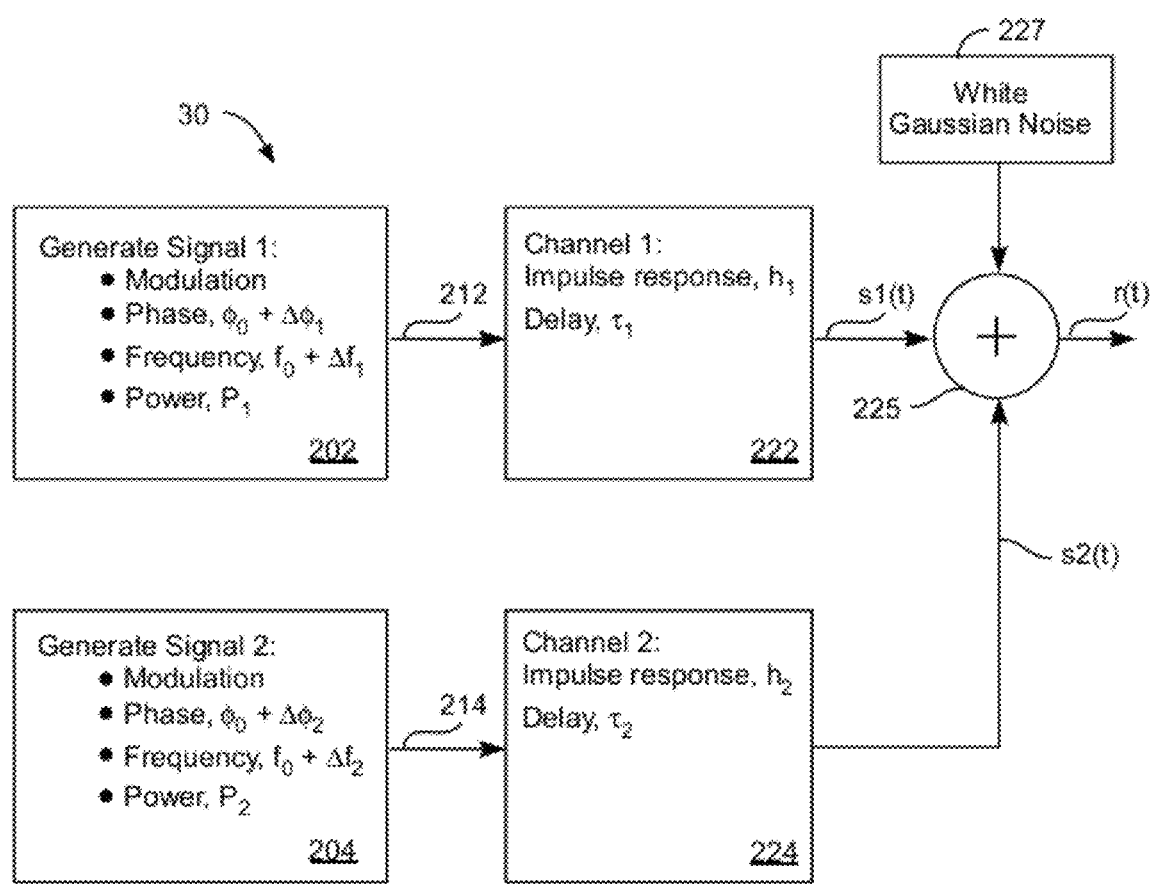
FIG. 3 is a block diagram of one embodiment of a co-channel signal model of the signal separator of FIG. 1.

FIG. 3 shows one embodiment of a co-channel signal model for the transmitters and transmission medium 30. Signals 1 and 2 (212, 214) may be generated when two symbol streams modulate two carriers. These generated signals are characterized by respective modulation, phase ($\phi_0 + \Delta\phi$), frequency ($f_0 + \Delta f$), and power (P) parameters. Corresponding channels 222, 224 are characterized by impulse response (h) and delay ($\tau$) parameters. A received signal r(t) is modeled by summing signals $S_1(t)$ and $S_2(t)$ of the respective channels and noise n(t), such as additive white Gaussian noise (AWGN) 227 assumed to be added to the signal by the channels, at 225.

Referring to FIG. 2, the signal capture device 208 may provide a digital representation ($r_0, r_1, \ldots, r_k, \ldots$) of the received signal r(t) at an output 210. In various embodiments, the signal capture device may include one or more of an antenna, a down converter, an anti-aliasing filter, and an Analog-to-Digital (A/D) Converter. For example, a device for capturing a satellite signal can include all of these components. In embodiments without matched filtering, oversampling may be employed to compensate for the lack of a matched filter at the signal capture device 208. Oversampling may make the algorithm of second channel estimator 500 more robust to symbol-timing misalignments. Among other things, oversampling may allow the capture of "sufficient statistics" from the received signal and enables channel estimation without knowledge of the channel impulse response. In some embodiments, A/D converter sample rates may be greater than two times the data rate. For example, embodiments sampling intermediate frequencies (IF) may utilize sample rates in the range of two to ten times the data rate.

From the signal capture device, digital data ($r_0, r_1, \ldots, r_k, \ldots$) may be passed to the initializer block 300 where an initial channel estimate is made and data is suitably formatted for the detector 400. Channel estimation by an initial channel estimator 306 may provide initial guesses for channel parameters 308 that will be used by the detector 400. For example, for the case of two channels with two taps each, a first estimate may be $h_1=[1, 0]$ and $h_2=[1, 0]$, a second estimate may be $h_1=[1, 0]$ and $h_2=[0,1]$, a third estimate may be $h_1=[0, 1]$ and $h_2=[1, 0]$, and a fourth estimate may be $h_1=[0, 1]$ and $h_2=[0, 1]$. In some embodiments, the initial condition may be given by two channel impulse responses with a single non-zero tap each. This will take care of h and τ (the delay being the position of the non-zero tap). As for ϕ and f, they may be estimated by the second channel estimator 500, unless prior information can be used; for instance, if this is not the first data block, a good initial estimate for ϕ and f are the values estimated in the previous block.

Data formatting may provides a digital representation of the received signal r(t) suited for use by the detector. In various embodiments, data 310*b* provided to the detector 400 may be formatted by a decimator 302 that decimates the data ($R_0, R_1, \ldots, R_k, \ldots$). And, in some embodiments, the data is formatted into data blocks 304 for block detection, each data block corresponding to N symbols in the original signals 212, 214. As shown in FIG. 2, the decimated data is formatted into blocks suited for block detection algorithms. In other embodiments the data is formatted for symbol by symbol detection.

From the initialization block 300, the initial channel estimates 310*a* and the data 310*b* from data block 304 may be passed to a detector 400 for symbol detection. Detected symbols may be passed to the second channel estimator 500 from an output 410 of the detector 400. Various symbol detection and channel estimation algorithms may be used. These include 1) joint maximum-likelihood (ML) channel estimation and block sequence detection procedure, 2) joint maximum-a-posteriori (MAP) symbol-by-symbol detection with least mean square LMS or recursive least square (RLS) channel estimation and tracking, or 3) Viterbi sequence detection with per-survivor LMS or RLS channel estimation and tracking. In some embodiments, LMS and RLS techniques may be used in conjunction with the second channel estimator 500. Here, the channel estimation operation cannot be neatly separated from the trellis 402. Each trellis state may have its own LMS/RLS channel estimator, and the trellis 402 and second channel estimator 500 may work in synergy. In some embodiments, the second channel estimator 500 may be eliminated.

In various embodiments, an iterative joint maximum-likelihood (ML) channel estimation and block sequence detection procedure may be used. Here, the states of the detector 400 states may be augmented to include the memory of the two signals' channels (impulse responses) and the memory provided by the channel codes, if present. The second channel estimator 500 may be used to provide the sequence detector with information about the symbol timing, phase offset, and generally the channel impulse responses experienced by the two incoming signals. In particular, this embodiment may include a blind Viterbi detector 400 implementing a block maximum likelihood (ML) algorithm in the assumption that the received signal is buried in Gaussian noise. A trellis structure 402 in the Viterbi detector 400 may combine the memory of the two signals, e.g., the two impulse responses as seen by the two signals and the redundancy due to the channel code, if present. In various embodiments, the detected symbols may be made available from and/or stored in the symbol detector 404.

Figure 4:
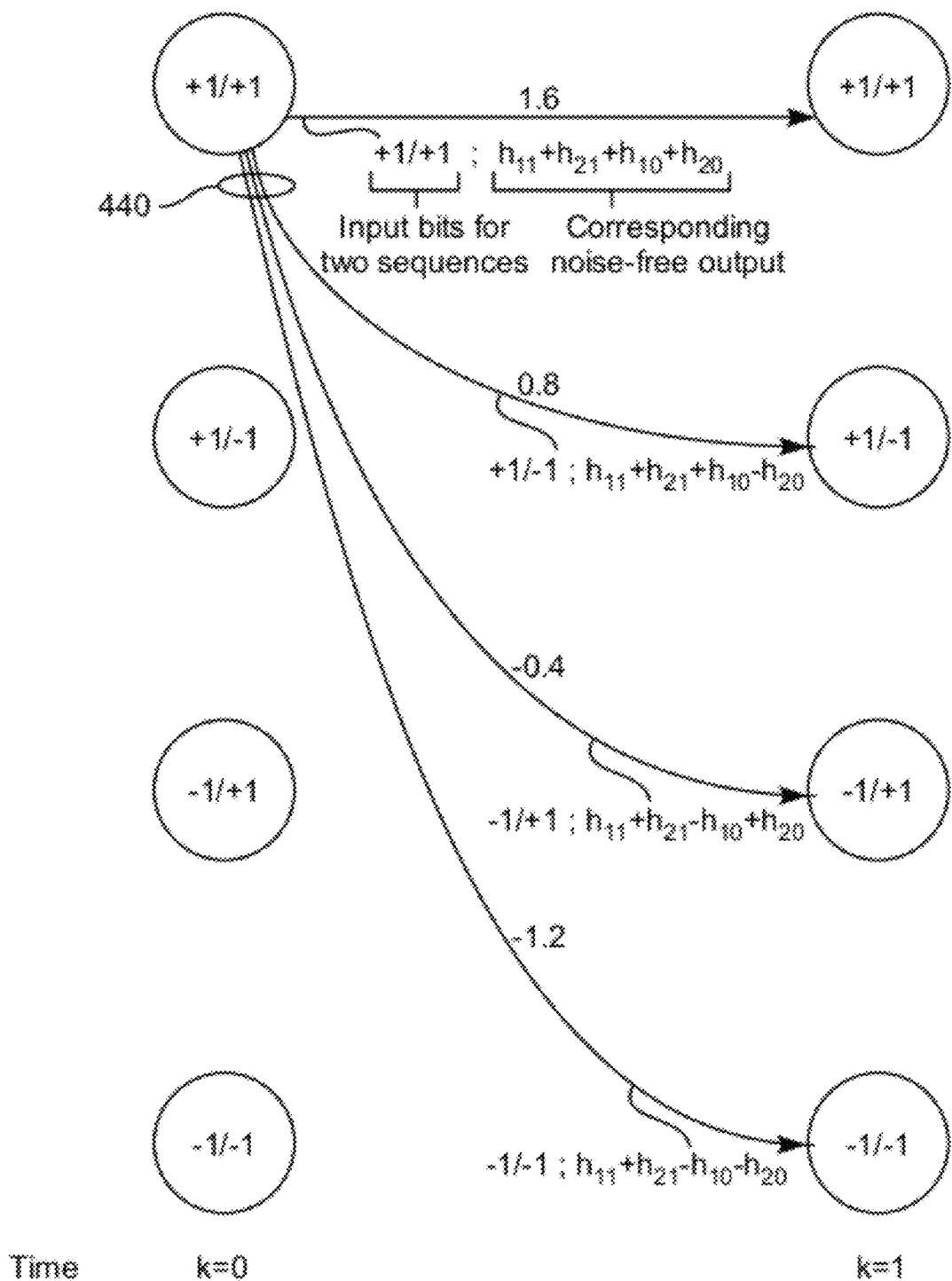
FIG. 4 depicts an exemplary slice of a trellis of one embodiment of the signal separator of FIG. 1.

FIG. 4 shows a slice of one embodiment of a trellis 402 for implementing a joint maximum likelihood detector that corresponds to transmission of two bits. As shown in this embodiment, the figure refers to binary modulation, two channels of memory and no oversampling. As will be appreciated by a person of ordinary skill in the art and as further discussed herein, other embodiments may include one or more of oversampling, different modulation, and different memory channels. The exemplary trellis structure shown in FIG. 4 assumes there are two channels, $h_1$, $h_2$, and that they are known such that $h_1=[h_{10}, h_{11}]$ and $h_2=[h_{20}, h_{21}]$. Here, the subscript $x_0$ may indicate the current value of the $x^{th}$ channel tap and the subscript $x_1$ may indicate the prior value of the $x^{th}$ channel tap. The states at the left side of the trellis are possible values of the previously sent bits while the states at the right side of the trellis are the possible values of the currently received bits. As can be seen, the number of channels and channel taps per channel determines the structure of the trellis.

States of the trellis $[s_1/s_2]$ correspond to all of the values that two binary signals can take on; +1/+1, +1/−1, −1/+1 and −1/−1. The exemplary trellis slice of FIG. 4 therefore shows the possible values that two binary signals can take on at two different times k=0 and k=1, each time being indicated by a vertical column of possible states. Branches from one trellis column (time k=0) to the next (time k=1) are associated with received bits $[b_1, b_2]$. In this case, a transition from a particular prior state to a current state can occur along any of four trellis branches depending on the bits received. An expected output is associated with each branch and is a function the current state $[s_1/s_2]$, the received bits/incoming symbols $[b_1, b_2]$, and the channels $[h_{x0}, h_{x1}]$: Expected Output=$S_1h_{11}+S_2h_{21}+b_1H_{10}+b_2h_{20}$. For example, from state +1/+1 there re four possible transitions or branches given four possible sets of incoming symbols. In each case, there is an expected output as shown below.

| Incoming Symbols | Expected Output |
| --- | --- |
| +1/+1 | $h_{11}+h_{21}+h_{10}+h_{20}$ |
| +1/−1 | $h_{11}+h_{21}+h_{10}-h_{20}$ |
| −1/+1 | $h_{11}+h_{21}-h_{10}+h_{20}$ |
| −1/−1 | $h_{11}+h_{21}-h_{10}-h_{20}$ |

Figure 5:
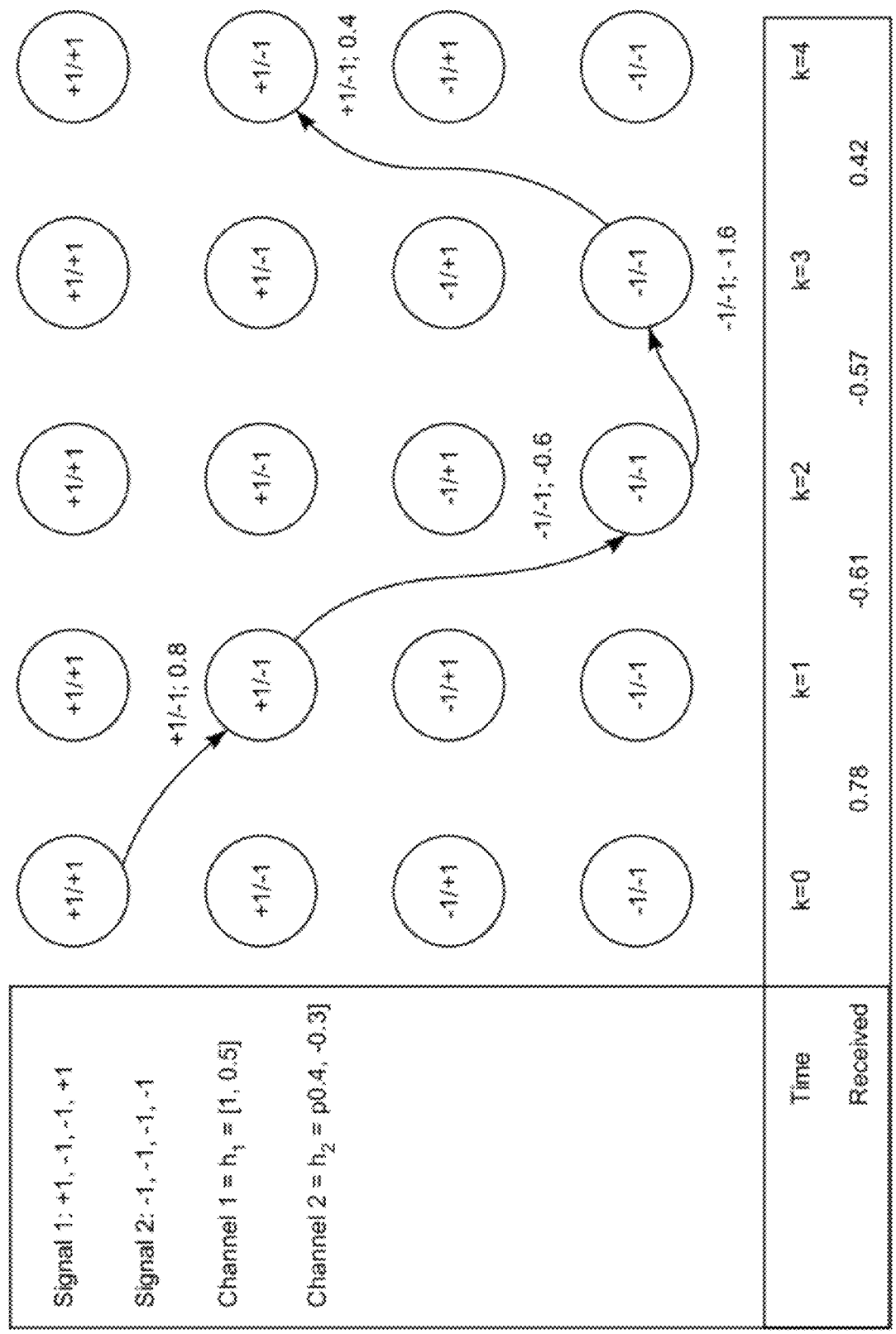
FIG. 5 depicts an expanded trellis of one embodiment of the signal separator of FIG. 1.

Because all of the possible combinations of two binary signals (+1/+1, +1/−1, −1/+1 and −1/−1) are represented in each trellis column, a trellis having a depth (number of columns) equal to one plus the number of symbol pairs received can represent every possible sequence received. The paths along interconnected trellis branches identify unique symbol sequences. FIG. 5 shows one embodiment of the trellis of FIG. 4 expanded to accommodate four sets of bits received from two channels. In the example shown, the channel estimates are $h_1=[1, 0.5]$ and $h_2=[0.4, -0.3]$ and the received sequence y(t) is 0.78, −0.61, −1.57 and 0.42. Because the trellis incorporates every possible sequence of symbols, detection requires identifying a particular path through the trellis corresponding to the received sequence. FIG. 5 shows the most probable path through the trellis as +1/+1, +1/−1, −1/−1, −1/−1, +1/−1 given the channel estimates $h_1$, $h_2$ and the received sequence y(t).

Any suitable probability method known to persons of ordinary skill in the art may be used to identify the most likely trellis path. In some embodiments, trellis path probabilities are identified where each possible path has a path metric equal to the sum of the metrics for each branch in the path. And, in various embodiments branch metrics are based on a negative log-likelihood function (assuming, for example, AWGN), such that smaller values of the metric indicate higher probabilities. Here, it follows that the path through the trellis with the smallest path metric identifies the most probable path and thus the symbols most likely received at the signal capture device 208.

Figure 6:
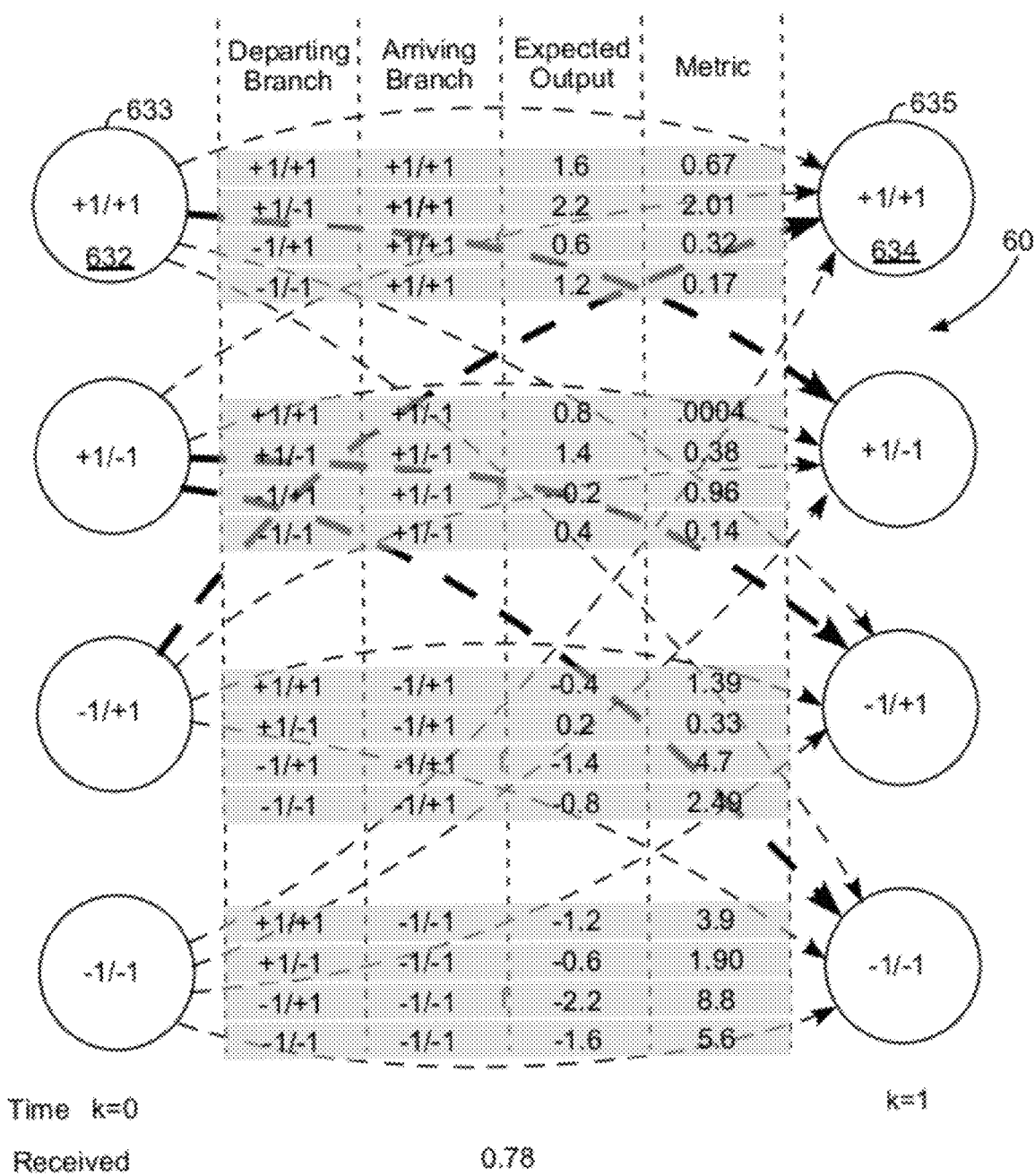
FIG. 6 illustrates a method of selecting a path through a trellis of according to one embodiment of the signal separator of FIG. 1.

FIG. 6 illustrates one embodiment of a method 60 of selecting a most likely path from a trellis slice for time k=0 to a trellis slice for time k=1 where the received value is 0.78. An appropriate negative log-likelihood function is LLF=(expected output−received value)² such that the Metric$_k$=Metric$_{k-1}$+(expected output−received value)². As persons of ordinary skill in the art will appreciate, (expected output−received value)² is the negative of the exponent of the normal (or Gaussian) density function, which is the assumed density of the noise (additive Gaussian noise). The negative log-likelihood function is the logarithm of the density function, multiplied by $^-1$.

As shown in the figure, each departing state 632 has four departing branches 633 extending to four different arriving states 634. In similar fashion, each arriving state 634 has four arriving branches 635 extending from four different departing states 632. Shown between the departing and arriving states are exemplary expected outputs and metrics at the arriving state. Not all of the sixteen arriving branches need to be carried forward. Rather, including only the branch with the lowest valued metric at each state is sufficient to discover the most probable path through the trellis. Such branches are commonly termed "survivors" and as seen in this example they have values of 0.32, 0.0004, 0.33 and 1.90 (see boxes). As persons of ordinary skill in the art will appreciate, this follows from the Viterbi algorithm: because positive metrics add as one proceeds in the trellis, any path that goes through state +1/+1 (See 634 in FIG. 6) would have an accumulated metric no smaller than the one that at time k=1 has metric 0.032, therefore the three paths that have higher metrics at time k=1 can be safely dropped as they have no chance of surviving.

FIGS. 7A and 7B show trellis calculations for the exemplary trellis at times k=0, 1, 2, 3 and 4. Like FIG. 6, at time k=1, the metrics column shows the metrics and the survivors (see boxes) for each arriving branch. At time k=2, the metrics may be calculated for each possible branch from each survivor at time k=1 (in this example, 4*4 or 16 metrics are calculated for each received value). For example, 0.0324 is the value of the survivor corresponding to state +1/+1 at time k=1 and its possible new branches are to states +1/+1, +1/$^-$1, −1/+1, and at time k=2. As seen in FIG. 7A, the metrics for these new branches are 4.9165, 2.0205, 0.0765 and 0.3805. Trellis calculations may proceed in similar fashion until a trellis end is reached. As can be seen in FIG. 7B, the trellis end survivors at time k=4 are 0.1378, 0.0018, 1.4898 and 2.9938.

Figure 7C:
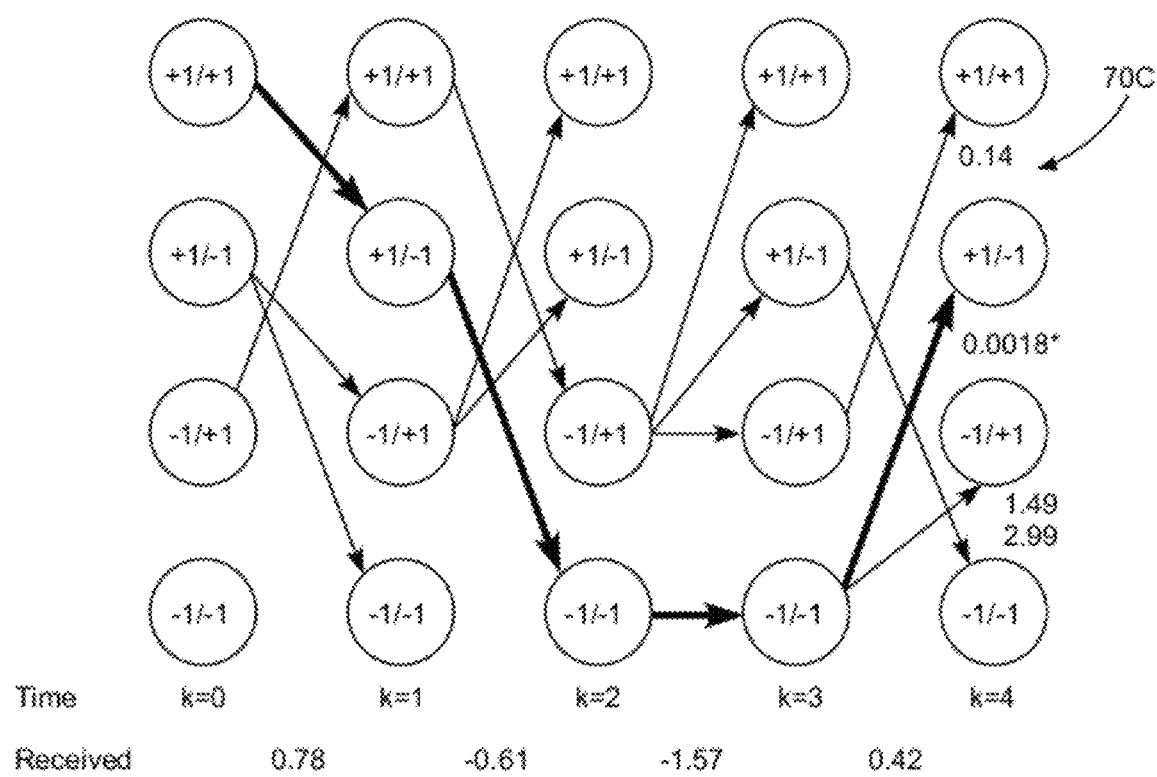
FIG. 7C depicts trellis end survivors for a trellis of one embodiment of the signal separator of FIG. 1.

FIG. 7C shows each of the four survivors at each state and in particular the four survivors at the final state 70C. Because the most probable path corresponds to the smallest cumulative metric, the path with metric 0.0018 is the winning path. This path identifies a unique sequence of symbol pairs +1/$^-$1, −1/$^-$1, $^-$1/$^-$1, and +1/$^-$1. The detected signals are therefore Detected Signal 1: +1, $^-$1, $^-$1, +1 and Detected Signal 2: $^-$1, $^-$1, $^-$1, $^-$1.

Symbols detected by the detector are passed to the second channel estimator 500 where a channel estimate (φ, τ, h, f) for each channel is produced 502. In various embodiments, the channel is estimated by a least squares (LMS) estimator, itself a maximum likelihood estimator in the Gaussian noise assumption. Sequence detection and channel estimation may be iterated and tested as described below.

Referring again to FIG. 2, a channel convergence tester 602 of the test block 600 monitors channel estimates 502 for convergence of the estimates made for each channel. If one or both channels fail the convergence test, another iteration is performed where the last channel estimates 502 are passed to the detector and the same block of data is processed again, along with the updated channel estimates. For example, this test can be given by the comparison of the estimated channel impulse response (inclusive of delay, phase, and frequency) at the current time and the one at the previous time. If there has been no appreciable change (e.g., norm of the difference is less than a user-defined threshold), then convergence has been reached.

Suitable channel convergence tests include those known to persons of ordinary skill in the art and in particular include convergence tests based on differences between successive estimates of (a) one or more channel parameters or (b) combinations of two or more channel parameters. For example, in various embodiments, the norm or two-norm of the difference of successive channel impulse responses indicates convergence when it falls below a threshold value. And, in some embodiments the threshold is based on an estimated (or expected) value of the signals' amplitudes so exact knowledge of the signals 212, 214 is not required.

If the estimates for each channel have converged, a symbol sequence tester 604 of the test block 600 may operate to test the goodness of the symbol detection. The goodness of the symbol detection may be assessed using any means known to persons of ordinary skill in the art. For example, in various embodiments trellis metrics may be passed 406 to the symbol sequence tester 604 from a detector trellis output 412. And, in some embodiments the symbol sequence tester may evaluate the goodness of the symbol detection by comparing the trellis end survivors' metrics. In various embodiments, the symbol sequence detector looks at the survivors' metrics to determine if there is a clear winner.

In various embodiments, the symbol detection is accepted if the smallest trellis end survivor, the one representing the winning path, differs from other trellis end survivors by a factor greater than "r". The factor "r" may be user-defined and frequently lies in a range of about 2 to 10. In some embodiments, the factor "r" may be in a broader range of about 2 to 20. For example, in the above exemplary trellis the winning path metric is 0.0018; as compared with the next closest trellis end survivor, 0.14, these values differ by a factor greater than 70. In this case, the goodness of the symbol detection is proved and the symbols would be accepted.

Where the goodness of the symbol detection is shown by trellis metrics 406 or otherwise, the detected symbols are accepted and control returns to the initialization block 300. In the initialization block, another block of data 304 is formatted and passed to symbol detector 400 where the iterative process starts again using the most recent channel estimates from the second channel estimator 500. In some embodiments accepted symbols are passed to a symbol memory device 413 via an output 411 of the symbol detector 400.

As persons of ordinary skill in the art will recognize, some or all of the functions of the initializer block 300, symbol detector 400, second channel estimator 500, and test block 600 can be implemented in one or more software controlled devices. Such devices include one or more of digital processors, digital signal processors, integrated circuits, computers, and field programmable gate arrays including general or special purpose versions of any of these devices.

Various embodiments described herein utilize signal separation techniques to disassemble the composite signal having independent signal components in an overlapping bandwidth into its independent constituent components. It will be appreciated, however, that the techniques described herein may be utilized with alternative signal separation algorithms to achieve similar results. Signal separation, as described herein, may be used as a stand-alone technique or in conjunction with other bandwidth-sharing techniques to enable bandwidth sharing, for example, with signals originating from different physical transmitters/locations.

Figure 9:
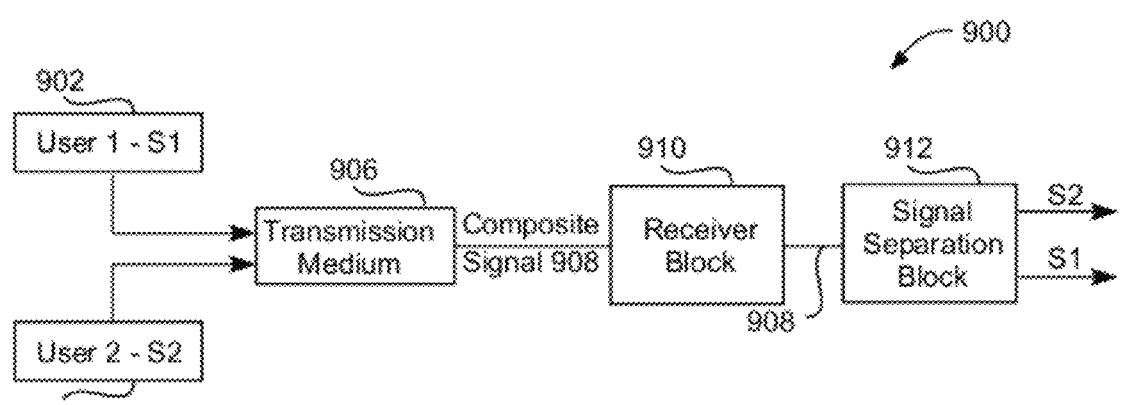
FIG. 9 illustrates a general block diagram of an embodiment of the application of a signal separation algorithm to separate data streams that at least partially overlap in bandwidth.

FIG. 9 shows a general block diagram 900 illustrating an example of an application of a signal separation algorithm to separate data streams that at least partially overlap in bandwidth. Two example data streams are represented by S1 and S2. The data streams S1 and S2 may have at least partially overlapping bandwidths. Data streams S1 and S2 may also have channel characteristics that are offset from one another. For example, data streams S1 and S2 may have offset carrier frequencies, bit timings, code phases, impulse responses, delays, etc.

The data streams S1 and S2 may be combined to form a composite signal 908. The data streams S1 and S2 may be combined according to any suitable method or technique. For example, the data streams S1 and S2 may be combined prior to transmission using any suitable hardware, algorithm, etc. In this case, the composite signal 908 may be transmitted from a single transmitter (not shown). Also, in some embodiments, the data streams S1 and S2 may be combined during transmission allowing the data streams S1 and S2 to be transmitted from different transmitters in different physical locations (e.g., 902, 904). Each location 902, 904 may have a transmitter and appropriate hardware and/or software for performing suitable pre-transmission processing on the data streams S1, S2 (e.g., interleaving, modulation, header creation, etc.). Because the data streams S1 and S2 have bandwidths that at least partially overlap, they may be combined into the composite signal 908 by virtue of passing via the same transmission medium 906.

A receiver block 910 may include appropriate hardware and/or software for capturing the composite signal 908. For example, when the composite signal 908 is transmitted in a wireless manner, the receiver block 910 may include an appropriate antenna. The receiver block 910 may also include appropriate hardware and/or software for performing preliminary processing of the composite signal 908, for example, similar to the signal capture device 208 described herein above. In various embodiments, the receiver block 910 may include appropriate hardware and/or software for converting the composite signal 908 to baseband. Other processing tasks may also occur at the receiver 910 including, for example, filtering, analog-to-digital conversion, etc.

The receiver block 910 may provide the composite signal 908 to a signal separation block 912. The signal separation block 912 uses, among other things, signal separation techniques to obtain the individual signal components in the composite signal. The signal separation block 912 increases the flexibility of using signal superposition techniques to increase the communication throughput since multiple users may receive the composite signal and obtain one or more signal components in the composite signal as desired. In this way, the signal separation block 912 may also receive as input a priori data describing a channel characteristic or characteristics of one or both of the first and second data streams S1, S2. Any channel characteristic may be used. Examples of suitable channel characteristics may include a modulation format, a code rate, a bit rate, a pulse shape, an error correction code, an interleaver description, a nominal carrier rate, a nominal data rate, etc. The signal separation block 912 may receive the channel characteristics in any suitable way. For example, in some embodiments; e.g. orthogonal polarization systems, the differences in the channel characteristics of the individual signal components may be established by design, but in other cases, the control of channel characteristics may become limited because a common frequency reference is unavailable at multiple locations and the bit timing and codes phase values may not be coordinated and maintained at multiple locations. Also, according to various embodiments, the individual signal components comprising the composite signal 908 may include a preamble or header that can be utilized by phase and delay lock loops to dynamically identify the channel parameters of the individual signal components. The signal separation block 912 may apply the channel characteristics in conjunction with a signal separation algorithm to separate the composite signal 908 into its constituent parts (e.g., data streams S1 and S2).

Figure 10:
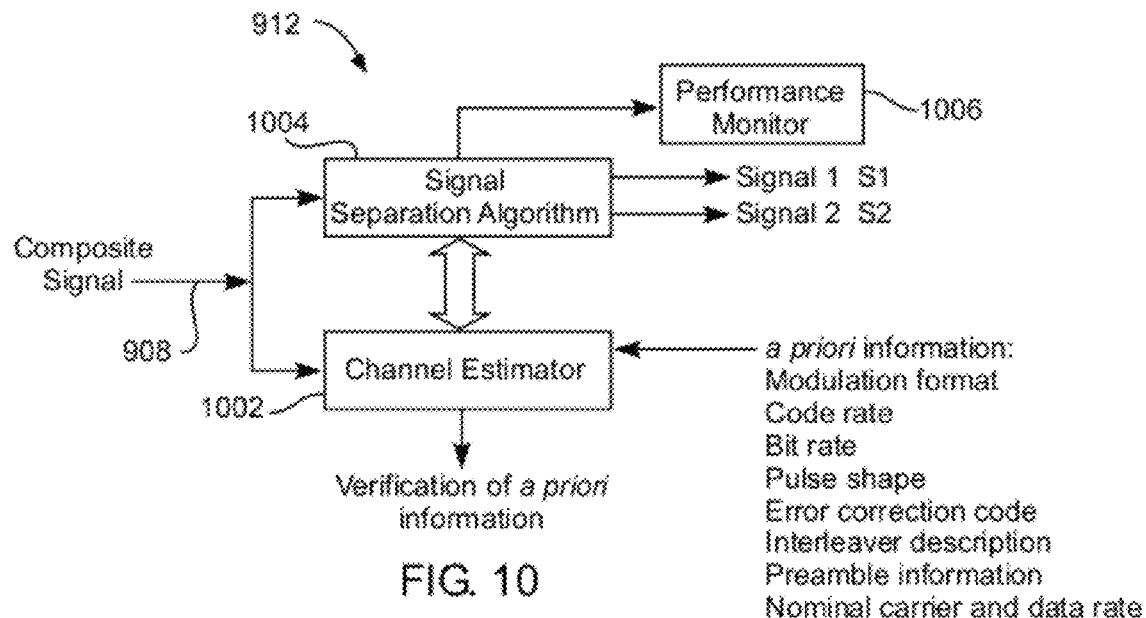
FIG. 10 shows a block diagram illustrating one embodiment of the signal separation block of FIG. 9.

FIG. 10 shows a block diagram illustrating one embodiment of the signal separation block 912 of FIG. 9. The components of the signal separation block 912 may be implemented using one or more programmable electronic circuits, such as programmable gate arrays (PGAs), application specific integrated circuits (ASICs), and/or processors (e.g., CPUs and/or GPUs). The programmable circuits may be programmed with associated software and/or firmware. The signal separation block 912 may include a channel estimator block 1002, an algorithm block 1004, and a performance monitor 1006. The channel estimator block 1002 may use a priori signal descriptions and dynamic measurements of the channel characteristics of the individual signals comprising the composite signal 908 and any potential time variation of these parameters. As illustrated in FIG. 9, the signal separation block 912 receives the composite signal 908. The channel estimator block 1002 may use a priori information to estimate channel characteristics of one or both of the data streams S1, S2. The a priori information may describe one or more aspects of one or both of the data streams S1, S2 and may be received in any suitable manner. For example, according to various embodiments, the a priori information may represent characteristics of the data streams S1 and S2 that are known to the transmitters of the data streams S1, S2 as well as the signal separation block 912 prior to transmission. Also, according to various embodiments, the a priori information include a header or preamble that may be encoded into the composite signal 908 by one or more transmitters.

The output of the channel estimator block 1002 may include channel description parameters for one or both of the data streams S1, S2. Examples of such channel description parameters include a carrier frequency or frequencies, a carrier phase or phases, a bit timing or timings, a data rate refinement or refinements, etc. The channel estimator 1002 interacts with the signal separation algorithm 1004 that separates the signal. The channel estimator's output may be provided to the algorithm block 1004, which may use the channel description parameters to derive the data streams S1 and S2 from the composite signal 908 according to any suitable manner. In some embodiments, application of the signal separation algorithm at block 1004 may also include error correcting coding and interleaving of the resulting data streams S1 and S2, for example, to randomize potential burst errors.

Figure 11:
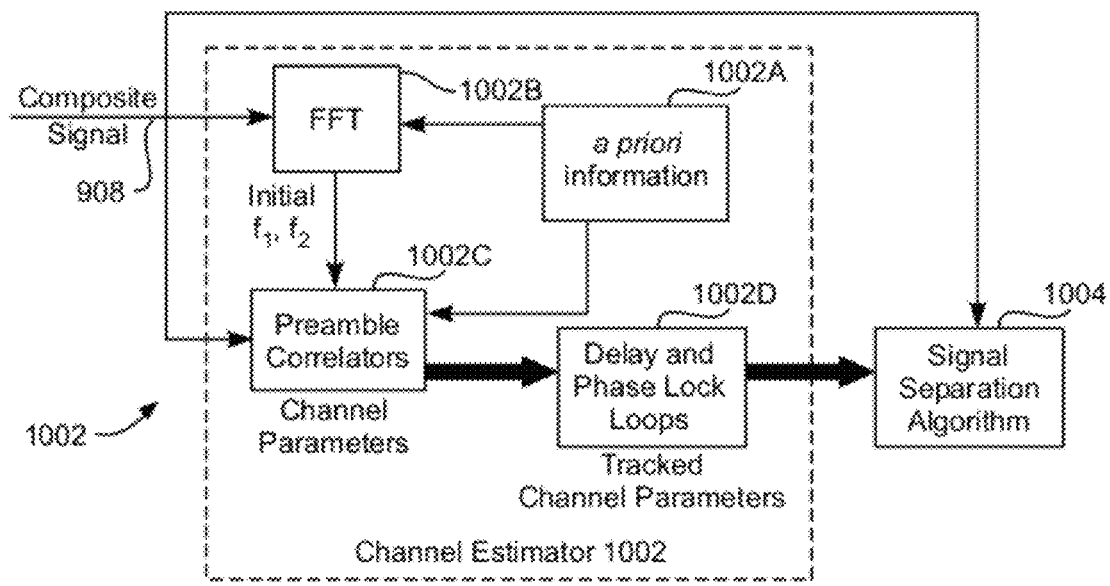
FIG. 11 shows a block diagram illustrating an embodiment of the channel estimator of FIG. 10.

FIG. 11 provides an exemplary channel estimator 1002 according to the application disclosed herein. The components of the channel estimator 1002 may be implemented using one or more programmable electronic circuits. As previously mentioned the channel estimator 1002 may use a priori information 1002A as initial values and perform measurements to further refine the channel parameter values. For example, Fourier analysis 1002B (e.g., fast Fourier transform (FFT) analysis) may be used to determine carrier frequency differences of the individual signal components in the composite signal 908. In addition, knowledge of the individual signal preambles may be used in a correlation process 1002C to further measure the channel parameters of the individual signals. Phase and delay lock loops 1002D for the individual signals may be applied to determine code phase and bit timing offsets between individual signal components. Accordingly, the channel estimator 1002 may dynamically track changes in the channel parameters. The capability to dynamically track channel parameter variations is particularly required when signal superposition is applied to mobile applications to compensate for Doppler and time delay variations.

Figure 12:
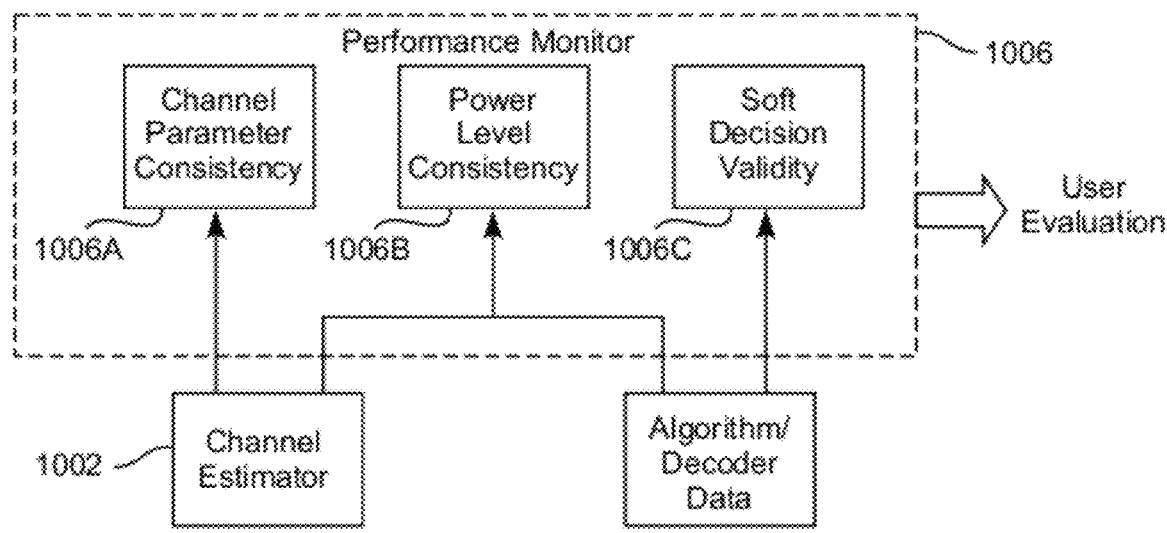
FIG. 12 shows a block diagram illustrating an embodiment of the performance monitor of FIG. 10.

FIG. 12 illustrates an exemplar performance monitor 1006 that is included in an embodiment of the signal separation architecture 912 as shown in FIG. 10. The components of the performance monitor 1006 may be implemented using one or more programmable electronic circuits. The performance monitor 1006 may monitor the operation of the signal separation algorithm 1004 to provide an indication of the reliability of the derived data streams S1, S2. The performance monitor 1006, for example, uses a variety of measurement to evaluate the quality of the signal separation and decoding processes including channel parameter consistency 1006A, power level consistency 1006B, and soft decision validity 1006C. Suitable channel parameter estimates have stable, well-behaved values with small time variations. Significant variation of the estimated values, for example, reflects questionable estimation performance. Small random variations, however, may indicate inadequate signal power levels. Accordingly, an exemplar signal separation process obtains a matched filter response for each of the separated signals. The channel estimator 1002 may measure the total signal power, output power, and noise levels of the independent signals after the separation of the signals occurs. If the sum of the signal and noise powers is less than the total power, for example, matched filter responses were not achieved and the reduced separated signal levels may correspond to increased implementation loss resulting form deviations from the desired matched filter response. Another performance monitor 1006 measurement may be implemented when, for example, recursive separation algorithms are used. In this example, the soft outputs of the decoders are examined to see if a valid codeword results. If a valid codeword results, then additional iterations are performed until the same codeword is present at least twice in succession.

Figure 13:
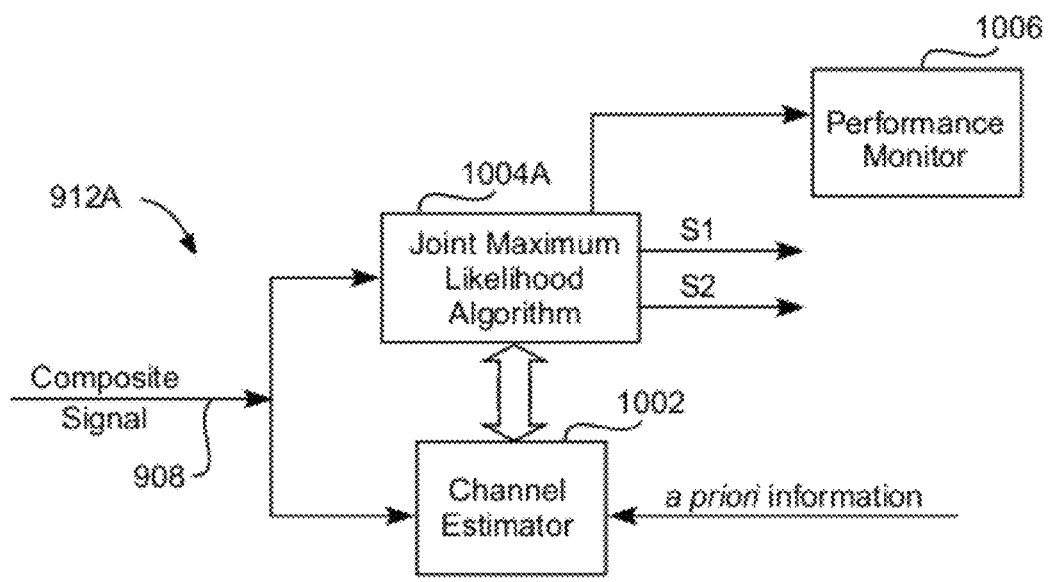
FIG. 13 illustrates one embodiment of the signal separation block of FIG. 9 utilizing a joint maximum likelihood algorithm.

FIG. 13 illustrates one embodiment of the signal separation block 912A applying a joint maximum likelihood signal separation algorithm 1004A. The components of the signal separation block 912A may be implemented using one or more programmable electronic circuits. According to various embodiments, the joint maximum likelihood signal separation algorithm 1004A may operate in a manner similar to that described above with respect to the symbol detector 400 and operatively related components described herein above. The joint maximum likelihood method uses the channel parameters measured by the channel estimator to construct a Viterbi algorithm procedure to separate signal components and the a priori signal information is used by decoders applied to the separated signal components to produce the independent data streams.

Figure 14:
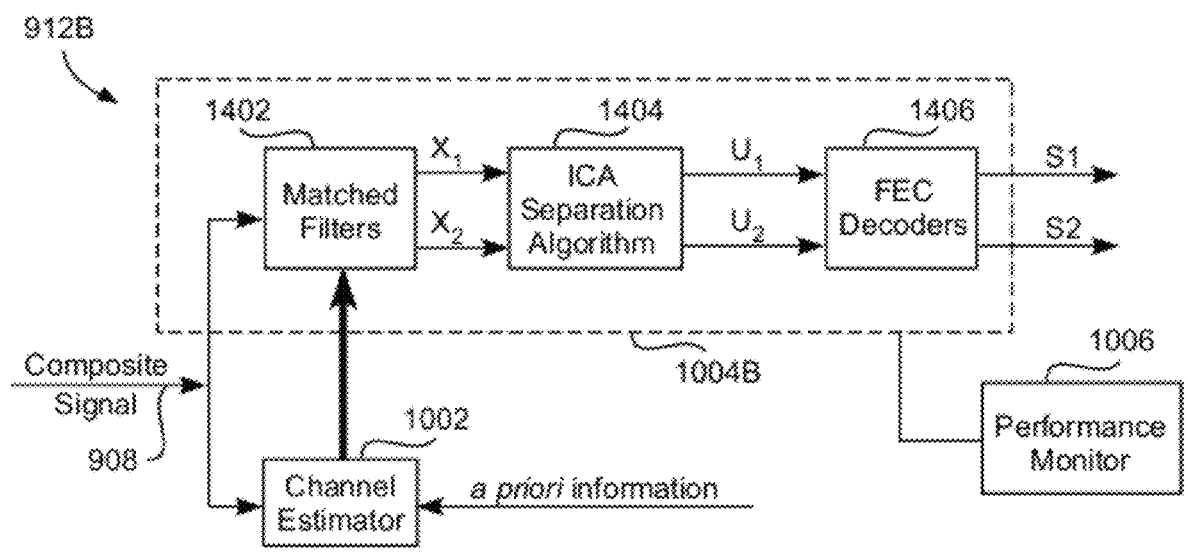
FIG. 14 illustrates one embodiment of the signal separation block of FIG. 9 utilizing an independent component analysis algorithm.

FIG. 14 illustrates one embodiment of the signal separation block 912B that implements a signal separation algorithm 1004B that includes an independent component analysis (ICA). The components of the signal separation block 912B may be implemented using one or more programmable electronic circuits. The ICA process typically views the composite signal in terms of a mixing matrix combining the signal components that are superimposed and deriving a separating matrix that is the inverse of the mixing matrix to separate the individual components from the composite signal. The channel parameters at the output of the channel estimator 1002 may be implemented to construct matched filters 1402 for an individual signal that are applied to the separation algorithm to determine the inverse matrix elements. The matched filters 1402 may be tuned to the data streams S1, S2 based on the channel parameters derived by the channel estimator 1002 from the a priori information and channel parameter measurements. The matched filters 1402 may be implemented by analog or digital (DSP) hardware/software. Outputs, $X_1$, $X_2$, of the matched filters 1402 may be provided to an independent component analysis algorithm 1404, which separates the individual signal components $U_1$, $U_2$. Each of the separated signal components $U_1$, $U_2$ may then be applied to forward error correction (FEC) decoders 1406 to generate data streams S1 and S2. The performance monitor 1006 may evaluate the performance and/or quality of the generated data streams S1 and S2 in any suitable manner including, for example, as described herein.

General principles of independent component analysis algorithms are described, for example, at "Blind Signal Separation: Statistical Principles," J. F. Cardoso, Proc. IEEE, pp. 2009-2025, October 1998, and "ICAR: A Tool for Blind Source Separation Using Fourth-Order Statistics Only," L. Albera et al., IEEE Transactions on Signal Processing, pp. 3633-3643, October 2005, which are incorporated herein by reference.

Figure 15A:
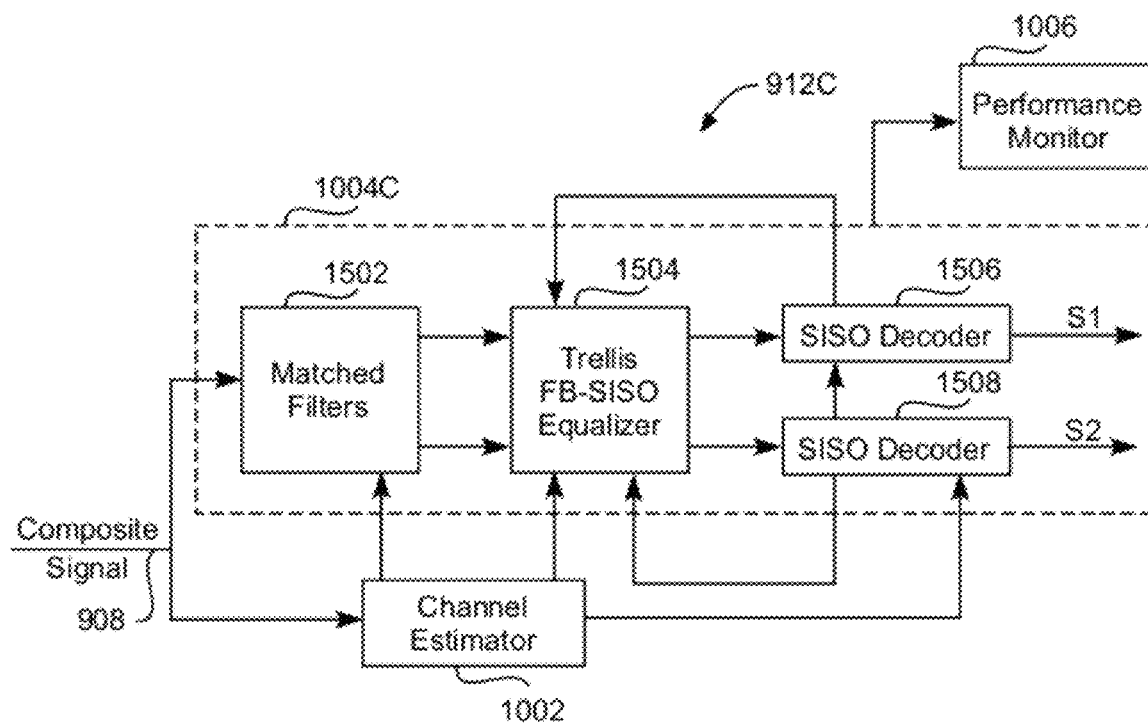
FIG. 15A illustrates one embodiment of the signal separation block of FIG. 9 utilizing a maximum-a-posteriori—matched filter algorithm.
Figure 15B:
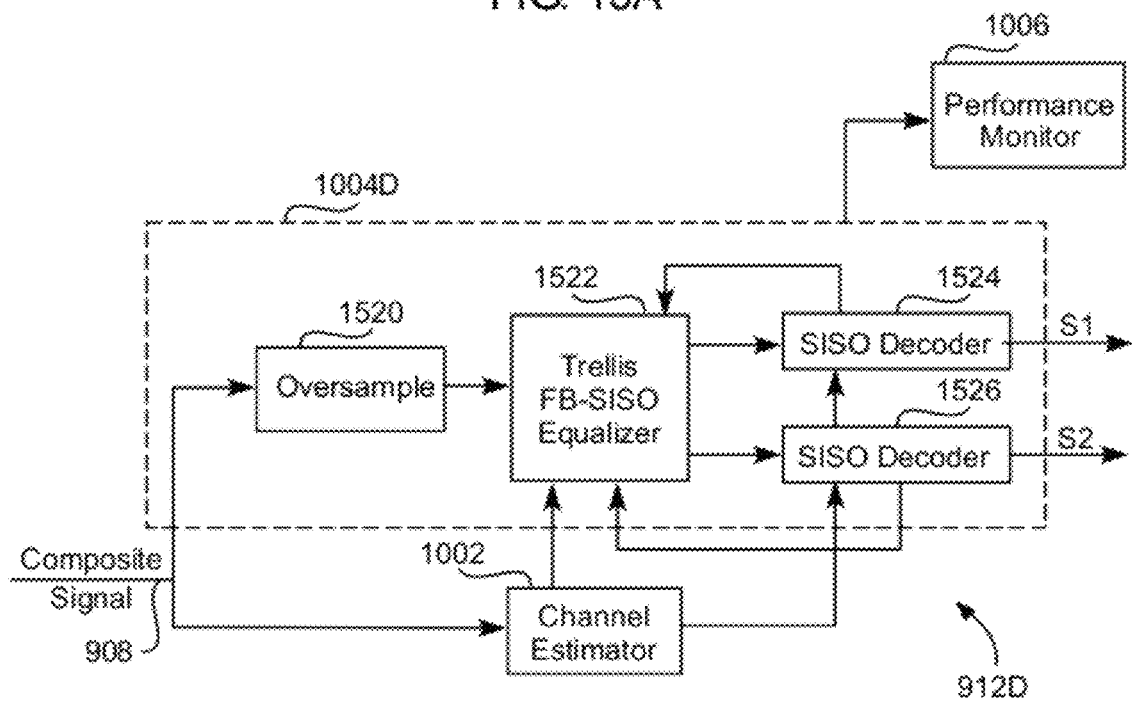
FIG. 15B illustrates one embodiment of the signal separation block of FIG. 9 utilizing a maximum-a-posteriori—turbo equalizer algorithm.

FIGS. 15A and 15B illustrate another example of the signal separation block 912 utilizing a signal separation algorithm block 1004 implementing a maximum-a-posteriori—turbo equalizer algorithm. The components of the signal separation block 912 may be implemented using one or more programmable electronic circuits. Two alternative configurations using maximum a posteriori principles are illustrated. The first approach is illustrated in FIG. 15A. This approach, like ICA shown in FIG. 14, uses the measured channel parameters from the channel estimator 1002 to implement matched filters for the signal components.

FIG. 15A illustrates one embodiment of the signal separation block 912C utilizing an algorithm block 1004C implementing a maximum-a-posteriori—matched filter algorithm. Matched filters 1502 may be implemented based on the channel characteristics estimated by the channel estimator 1002, for example, as described above with respect to FIG. 14. Like the matched filters 1402, the matched filters 1502 may be implemented by any suitable combination of analog and/or digital hardware/software. The outputs of the matched filters 1502 and the channel characteristics derived by the channel estimator 1002 may be received by trellis equalizer 1504 to generate soft-in/soft-out (SISO) signals, which may be used to operate SISO decoders 1506, 1508 to generate data streams S1 and S2. The decoders 1506, 1508 also send information back to the SISO trellis equalizer 1504. General principles of the operation of maximum-a-posteriori—matched filter algorithms in signal separation are described, for example, in "A Tutorial on Hidden Markov Models and Selected Applications in Speech Recognition," L. R. Rabiner, Proc. IEEE, 77:257-286, February 1989; "Optimal Decoding of Linear Codes for Minimizing Symbol Error Rate," L. R. Bahl et al., IEEE Tr. IT, 20:284-287, March 1974; and "Optimum Multiuser Detection," S. Verdú, Cambridge Univ. Press, 1998, Chapter 4, pp 154-233. General principles of the operation of maximum-a-posteriori—turbo equalizer algorithms including, for example, trellis construction and application, are described in "Turbo Equalization," R. Koetter et al., IEEE SP Magazine, January 2004, pp. 67-80, and "Turbo Equalization: Principles and New Results," M. Tuechler et al., IEEE Tr. Comm., May 2002, 50(5):754-767. The cited pages of these references are incorporated by reference herein.

FIG. 15B shows an alternative to the matched filter configuration of FIG. 15A. In FIG. 15B, the algorithm block 1004D may oversample the composite signal 908 at block 1520. For example, the oversample block 1520 may sample the composite signal 908 at a rate greater than or equal to twice its baseband frequency. According to various embodiments, the oversample block 1520 may incorporate a suitable analog-to-digital converter (not shown) for sampling. The oversampled composite signal may be provided to the maximum-a-posteriori trellis equalizer 1522. The trellis equalizer 1522 may implement a forward backward (FB) SISO approach. For example, as an FB approach, the trellis equalizer 1522 may be implemented in an iterative nature where confidence levels of adjacent bits are compared. Probabilistic decisions for individual bits in the respective data streams S1 and S2 may be made in a SISO manner. The output of the trellis equalizer 1522 may be provided to the SISO decoders 1524, 1526, which may generate the data streams S1, S2.

The above exemplar embodiments illustrate signal separation algorithms incorporating a priori knowledge and channel parameter measurements. In general, signal separation algorithms would be selected based on requirements for specific applications. In some applications, e.g., orthogonal polarizations, the independent signals may utilize a common frequency reference and the differences in the channel parameters may be selected and established by design to ease signal separation. In such applications, algorithms with modest computational complexity, such as the maximum likelihood algorithm, may provide acceptable performance. In other applications where channel parameters may not be easily controlled, more robust algorithms, such as the maximum a posteriori, that use recursive iterative decision processes to increase confidence in separation results may be appropriate even if at the expense of increased computation complexity.

Figure 8:
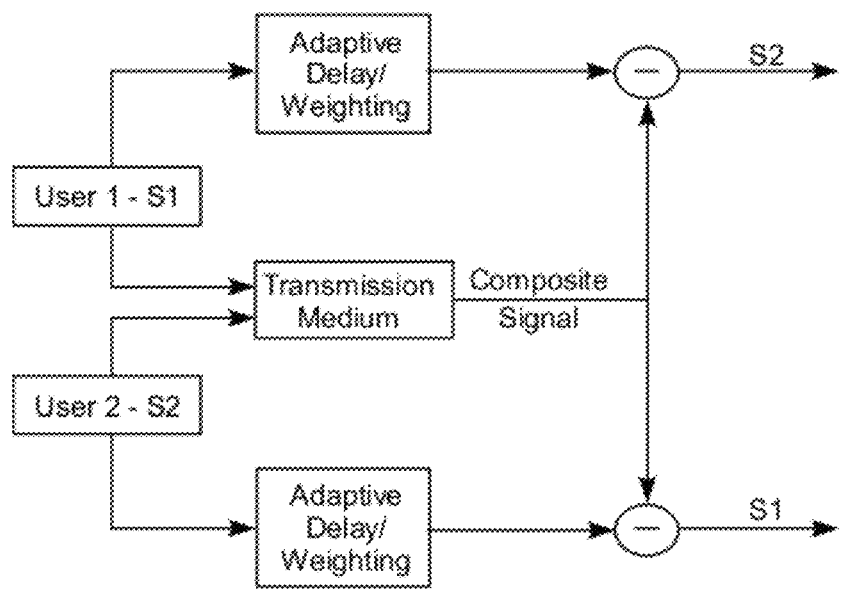
FIG. 8 shows a block diagram according to the prior art.

As illustrated in the Figures, the methods and systems disclosed herein implement signal separation techniques and increase communication throughput. Earlier methods, such as adaptive cancellation, are restrictive because a replica of one signal is required to obtain the other signal. (See, e.g., FIG. 8). If, for example, a composite signal is broadcast to multiple users, a signal replica must be available to each user to separate the other signal in the composite received signal. Alternatively, signal separation techniques such as the examples disclosed herein may increase the flexibility of using signal superposition techniques to increase the communication throughput because, for example, multiple users may receive the composite signal and obtain one or more signal components in the composite signal as desired. If, for example, the individual signals have different preambles known to the users, signal acquisition and separation may be performed more easily.

Figure 16:
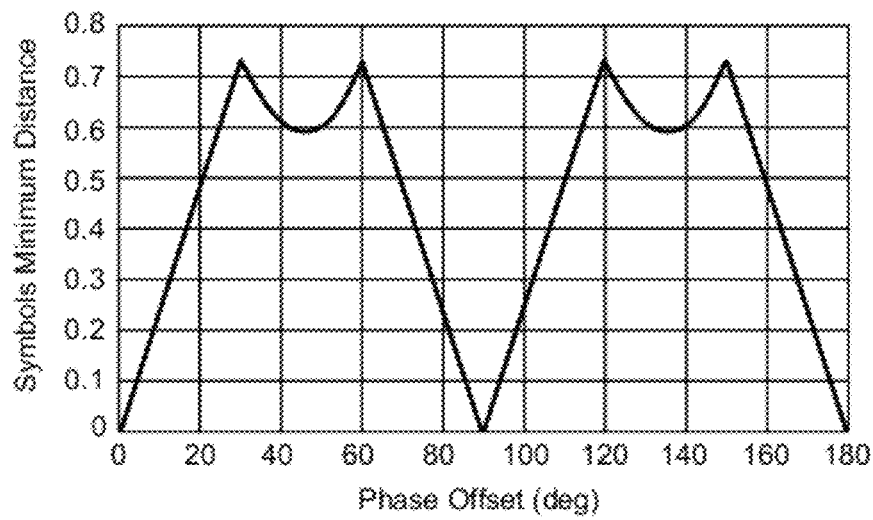
FIG. 16 is a graphic depiction of a signal symbol minimum distance separation and phase offset.

FIG. 16 illustrates an example of signal superposition application where a form of a signal modulation format known as QPSK is used. If QPSK modulation is used in signal superposition techniques, an examination of the minimum symbol separation for the other component signals in FIG. 15A and B shows that the maximum symbol separation occurs for code phase values of 30° and 60°. The maximum symbol separation for additional signal components provides the most reliable communication performance. As a result, three QPSK signals, for example, may be superimposed into a composite signal with the result being a 50% increase in communication throughput in comparison to the earlier methods of adaptive cancellation for signal separation. These results further suggest that a single user that has control over the carrier frequency, code phase and bit timing parameters may superimpose three independent data streams to increase that user's throughput as an alternative to using higher order modulation. Such an approach may be cost effective because QPSK communication modems typically are more commonly available than modems for higher order modulations. Moreover, the transmitter linearity requirements for QPSK modulation may be less stringent than those for higher order modulations. The transmitter linearity problem requires reducing the transmitter output level to a value below its nonlinear saturated output level thus reducing the signals' transmitted power level and, consequently, the user receiver may have a correspondingly reduced signal level and degraded detection performance.

Another example of the signal separation approach of the application includes situations where the same frequency bandwidth is shared by independent data streams that are isolated by polarization or spatial separation. Two signals are commonly transmitted on the same frequency bandwidth by using orthogonal polarizations that allow the communication throughput to be doubled, a technique commonly referred to as polarization reuse. Similarly, the same frequency bandwidth may be reused when the signals are spatially isolated—referred to as frequency reuse—as may occur with satellite uplink antennas that communicate to different coverage areas that are spatially separated. Alternatively, frequency reuse may apply in terrestrial communication systems where signals are using the same frequency bandwidth coming from different directions and are received in a common location. These independent signals must be isolated from one another. Conventionally, passive design techniques accomplished the required signal isolation. When orthogonal polarization is used, stringent requirements are applied to the polarization purity to obtain the required isolation. These requirements exist for both the transmitting antenna and the receiving antenna systems. Likewise, when independent signals are used in spatially isolated areas, requirements are placed on the sidelobe levels of receiving antennas so that signals from other spatial locations do not interfere with the signal aligned with the antenna's main beam. These requirements on the system antennas may increase the cost of their implementation. Moreover, shortfalls in the passive design approaches to obtain the required signal isolation degrade communication performance.

Figure 17:
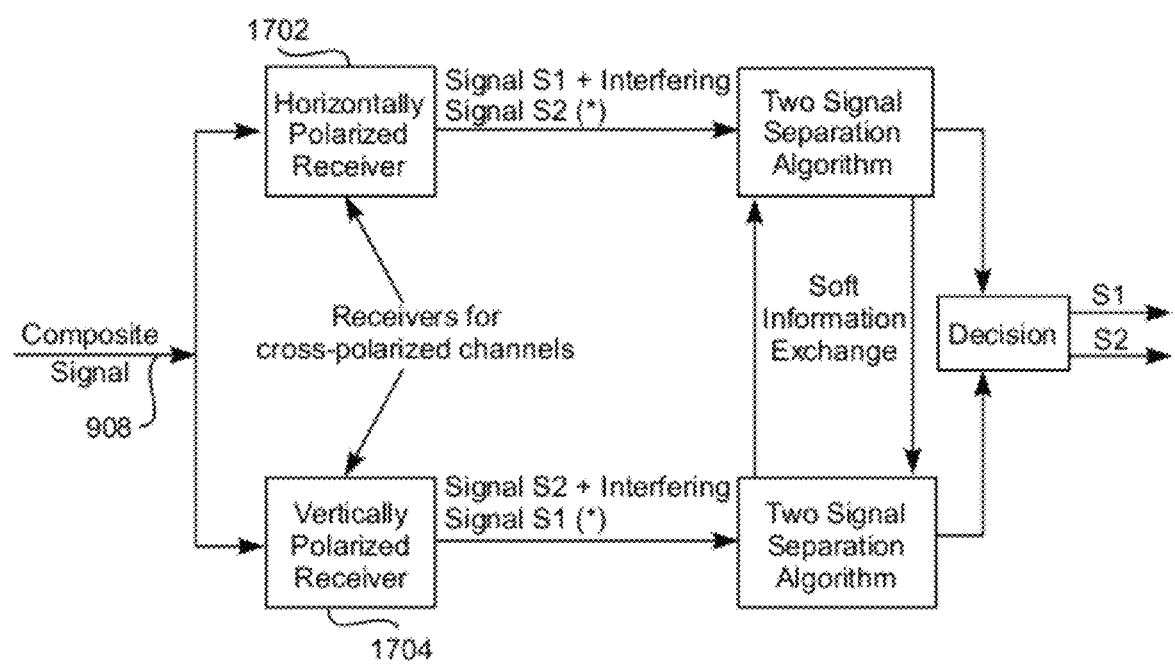
FIG. 17 illustrates an embodiment of the signal separation block of FIG. 9 using polarization techniques.

FIG. 17 illustrates a signal separation architecture for polarization reuse having two receivers 1702, 1704 for two polarization components that are nominally orthogonal. Polarization reuse is an instance where a common frequency reference may be used and the channel parameter differences may be selected by design. The composite signal 908 has vertically and horizontally polarized signal components and, unavoidably, smaller levels of the cross polarized components resulting from the transmitting antenna and propagation medium. In this example, a composite signal is output from each receiver 1702, 1704. Each signal has a dominant signal output and a smaller undesired signal component of the other orthogonal polarization that is indicated by (*). Two signal separation algorithms are implemented that exchange soft information. The signal separation algorithms may be implemented using one or more programmable electronic circuits. The signal separation separates the desired signal on each polarization to avoid communication degradation from the lower level undesired polarization component. The illustrative signal separation technique in this application allows shortfalls to be addressed in the isolation provided by the antenna systems used in the link. Moreover, the illustrative signal separation technique of FIG. 17 may allow the passive design requirements on the system antennas to be relaxed, thus, reducing their implementation cost while increasing, e.g., doubling, the communication throughput.

Frequency reuse systems may also benefit from operations using signal separation techniques. The isolation from signals arriving from different angular directions is typically limited by the antenna sidelobes that couple unwanted signal components from other directions of arrival. The signal separation techniques of this disclosure may also address shortfalls in the isolation provided by passive sidelobe control. Signal separation techniques may also provide additional isolation that cannot be achieved through passive antenna design techniques that allow reduced angular separation between regions sharing the same frequency bandwidth.

Satellite communication systems typically divide the earth's field of view into different coverage areas. When these coverage areas are sufficiently separated, the same frequency bandwidth may be shared by users located within each of these coverage areas increasing the communication throughput of the satellite. Generally, the total available frequency allocation is divided into different subbands and a frequency reuse plan that assigns subbands to the various coverage areas is developed. A contiguous set of beams in an equilateral triangular arrangement produced by multiple beam satellite antennas is commonly used. A frequency reuse technique that divides the total allocated bandwidth into three subbands is the minimum number that avoids adjacent beams assigned to use the same frequency subband in such beam arrangements. If more isolation between coverage areas that share the same frequency subband is required, the total allocated bandwidth may be divided into seven subbands so that beams using the same frequency subband have greater spatial separation. When the frequency reuse plan has a smaller number of subbands, each subband has a greater bandwidth than when a frequency reuse plan has a larger number of subbands which increases the communication throughput. For example, suppose 21 beams are used and the total allocated bandwidth is 210 MHz. If the 7 beam frequency reuse plan is used, each subband would have a 30 MHz bandwidth. If the 3 beam frequency reuse plan is used instead, each subband would have a 70 MHz bandwidth. Since 21 beams are used in this example, the 7 beam frequency reuse plan provides 21×30 MHz or 630 MHz of bandwidth available for communication, whereas the 3 beam frequency reuse plan provides 21×70 MHz or 1470 MHz of bandwidth available for communication that provides much greater communication throughput than the 7 beam frequency reuse plan.

Similarly, terrestrial communication systems benefit when signal separation techniques are used. Like the polarization reuse application, signal separation techniques may address shortfalls in the isolation provided by passive antenna sidelobe control. Moreover, when signal separation augments the isolation provided by passive antenna sidelobe control, the minimum angular separation between terrestrial users may be reduced allowing more terrestrial users to converge on a given location increasing communication throughput. In operation, such systems typically use discrete antennas where each of the main antenna beams is aligned with a system user. The isolation between the angularly separated system users depends on the antenna's main beam gain level and the antenna sidelobe gain level in the direction of another system user. The isolation can generally be increased by increasing the antenna's size which increases the main beam gain level; however, this approach is costly and larger antennas are more sensitive to positioning variations from wind loading that degrade communication performance and sometimes have appearance issues.

In practical applications, the cost of achieving the required isolation by using passive design techniques may be weighed against the cost of the signal processing in the signal separation technique. Further, both the cross polarized components in the polarization reuse technique and the sidelobe levels in the frequency reuse technique have a frequency dependence. The signal separation algorithms may provide the necessary equalization to obtain the required isolation over the frequency bandwidth containing the composite signals.

Figure 18:
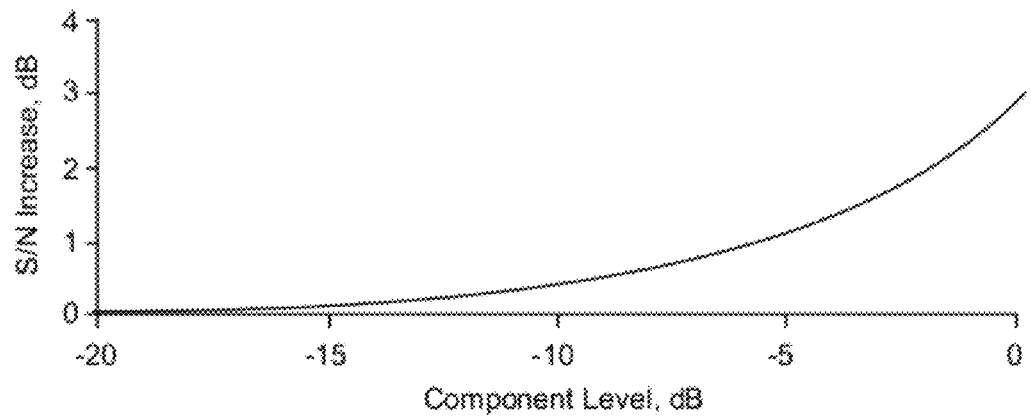
FIG. 18 is a graphic depiction of a signal to noise ratio according to principles of the application.

In some applications, the separation algorithms may result in both desired and undesired signal components. Rather than simply discarding the undesired signal components, the respective undesired signal components may be combined with their desired signal components to increase the signal levels of the desired components. For example, the undesired horizontally polarized antenna component in FIG. 17 may be combined with the desired horizontal component and similarly the undesired vertically polarized component received by the horizontally polarized antenna component. In this way, the signal power for the desired signal component may be increased improving signal detection performance. Maximal ratio coherent combining may be used and the increased signal to noise (S/N) ratio depends on the level of the lower level undesired signal component illustrated in FIG. 18. The benefits of such combining depend on the signal level of the undesired component. In addition, the implementation cost of such maximal ratio combining may be weighed against the signal increase benefits.

Figure 19A:
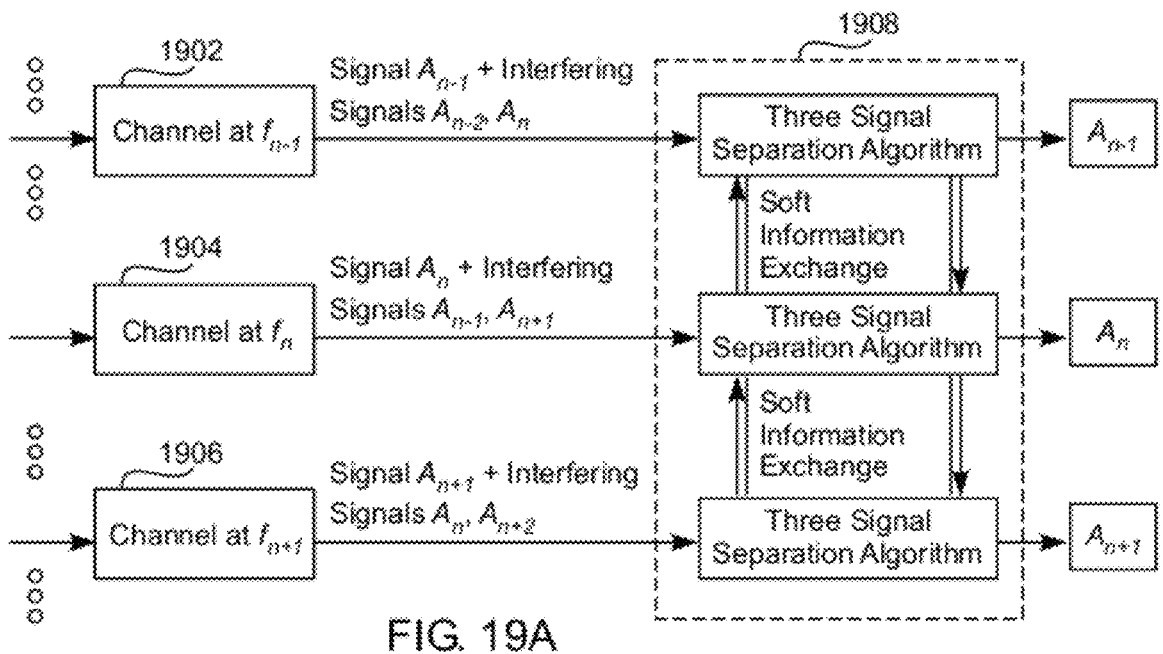
FIG. 19A illustrates an embodiment of the signal separation block of FIG. 9 in a FDMA system.
Figure 19B:
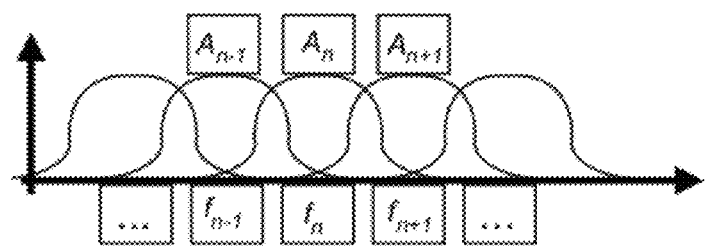
FIG. 19B shows a graphic depiction of the embodiment in FIG. 19A.

FIGS. 19A and 19B illustrate another example of applying the signal separation techniques of the present application to increase communication throughput. This example involves frequency division multiple access (FDMA) systems that divide the available signal bandwidth into frequency subbands allowing multiple users in allocated frequency subbands to simultaneously share the total bandwidth (see FIG. 19B). Typically, the spacing between individual frequency subbands is selected and user spectral filtering requirements are imposed to avoid mutual interference between users of the subbands, a technique commonly referred to as orthogonal spacing. Such spacing may limit the communication throughput that may be supported by the total allocated bandwidth. As illustrated in FIG. 19A, if signal separation techniques are employed on the individual subbands 1902, 1904, 1906, the user spectral components between subbands may overlap (as shown in FIG. 19B) but the required isolation may be achieved through the use of signal separation techniques 1908. If the individual subbands use a smaller bandwidth than dictated by orthogonal spacing, a greater number of subbands may share the total overall frequency bandwidth, thus, increasing the communication throughput.

The signal separation for FDMA shown in FIG. 19A generalizes the signal separation for two signals described in FIG. 10. In FIG. 19A, three components exist in a given subband: the desired signal component and undesired signal components from the two adjacent subbands. Again, maximal ratio coherent combining may be used to increase the desired signal power by separating the signal components in each of the two adjacent subbands and combining the signal components from the adjacent subbands with the desired signal in a given subband. The application of this signal combining depends on the level of signal powers in the adjacent subbands.

These example applications provide a description of the flexibility of the signal separation techniques in increasing the communication throughput. It should be understood that they have been presented by way of example only, and not limitation. It will be apparent to those skilled in the art that various changes in the form and details can be made without departing from the spirit and scope of the invention. As such, the breadth and scope of the present invention should not be limited by the above-described examples, but should be defined only in accordance with the following claims and equivalents thereof.

According to various embodiments, the signal separation techniques described herein, and generally with respect to FIGS. 1-19, may be incorporated when the data streams S1, S2 fully or partially overlap in bandwidth. The signal separation techniques described herein may also be implemented to separate the signals, allowing increased bandwidth utilization as substantially the same bandwidth may be used to transmit multiple signals. Also, according to various embodiments, the data streams S1 and S2 may partially or completely overlap. For example, the signal separation techniques described herein may be used in conjunction with other spatial, FDMA or CDMA techniques for re-using available bandwidth. The signal separation techniques described herein, however, may allow these other techniques to operate more efficiently. For example, with respect to an FDMA technique, buffer bandwidth between frequency slots may be eliminated and, in various embodiments, adjacent slots may be allowed to overlap. The signal separation techniques described herein may be implemented to resolve cross channel interference resulting from bandwidth overlap.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

The disclosure provided herein describes selected embodiments of the invention. The designs, figures, and description are provided for the purpose of teaching a person of ordinary skill in the art, by way of example and not limitation, how to make and use the claimed invention. For example, other embodiments of the disclosed systems and methods may or may not include the features described herein. Moreover, disclosed advantages and benefits may apply to only certain embodiments of the invention and should not be used to limit the disclosed invention.

This application incorporates by reference U.S. Pat. No. 6,026,121 to Sadjadpour filed Jul. 25, 1997 including the disclosure of columns 2-7 relating to utilization of least squares methods. This application incorporates by reference U.S. Pat. No. 6,910,177 to Cox filed Dec. 21, 2001 including the disclosure of columns 2-5 relating to utilization of Viterbi algorithm methods and the disclosure of columns 6-9 relating to utilization of trellises. This application incorporates by reference U.S. Pat. No. 7,330,801 to Goldberg et al. filed Jul. 31, 2006 including the disclosure of columns 7-9 relating to signal separation.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In general, it will be apparent to one of ordinary skill in the art that at least some of the embodiments described herein, including, for example, the initializer block 300, symbol detector 400, second channel estimator 500, test block 600 as well as the various blocks 906, 910, 910, 1002, 1004, 1006, etc., may be implemented in many different embodiments of software, firmware, and/or hardware, for example, based on Field Programmable Gate Array (FPGA) chips or implemented in Application Specific Integrated Circuits (ASICS). The software and firmware code may be executed by a computer or computing device comprising a processor (e.g., a DSP or any other similar processing circuit) including, for example, the computing device 2000 described below. The processor may be in communication with memory or another computer readable medium comprising the software code. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. According to various embodiments, the software may be firmware stored at an EEPROM and/or other non-volatile memory associated a DSP or other similar processing circuit. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Figure 20:
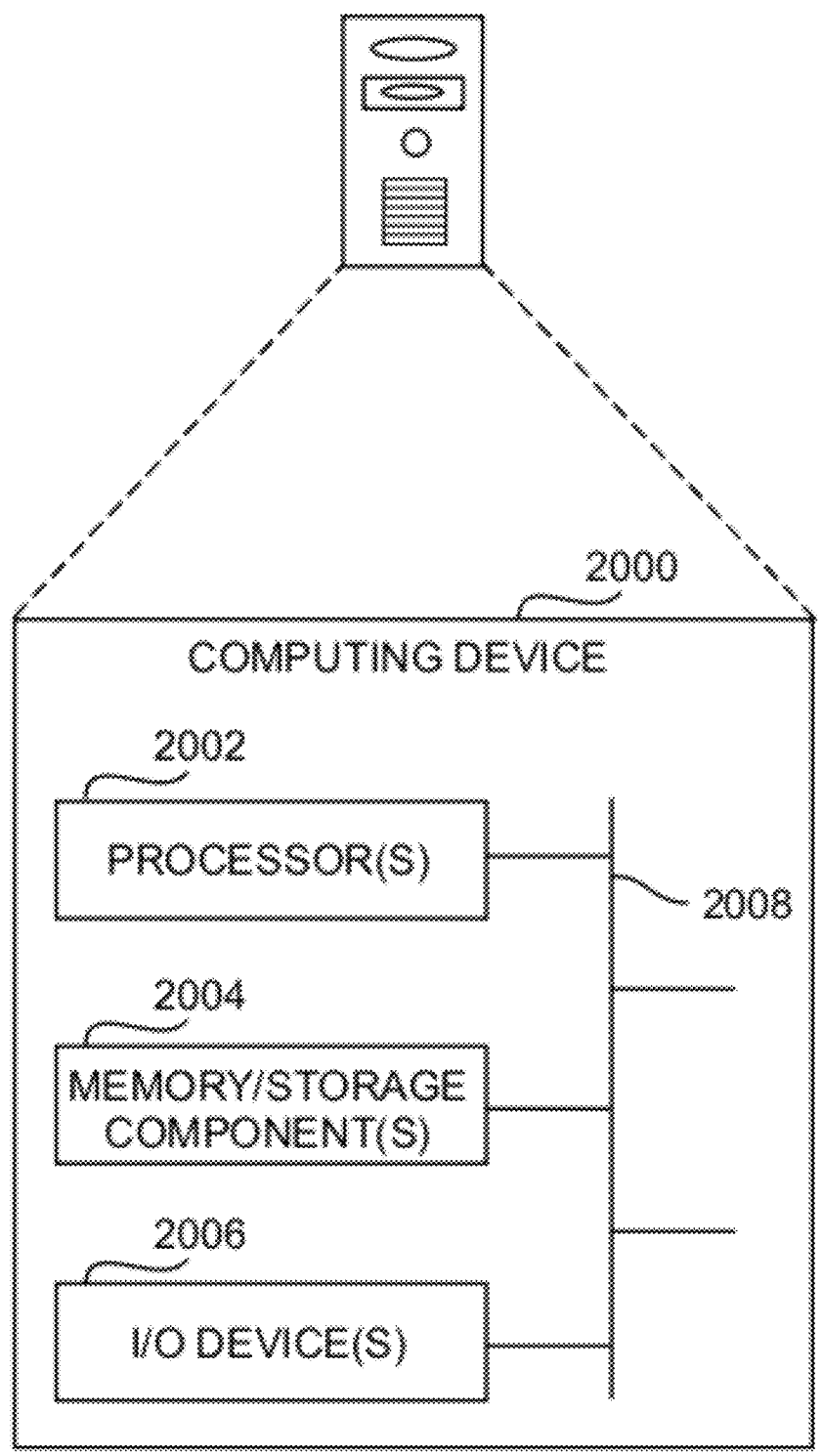
FIG. 20 shows an example of a computing device according to one embodiment.

FIG. 20 shows an example of a computing device 2000 according to one embodiment. For the sake of clarity, the computing device 2000 is illustrated and described here in the context of a single computing device. However, it is to be appreciated and understood that any number of suitably configured computing devices can be used to implement a described embodiment. For example, in at least some implementations, multiple communicatively linked computing devices may be used. One or more of these devices can be communicatively linked in any suitable way such as via one or more networks. One or more networks can include, without limitation: the Internet, one or more local area networks (LANs), one or more wide area networks (WANs) or any combination thereof.

In the example of FIG. 20, the computing device 2000 includes one or more processor circuits or processing units 2002, one or more memory circuits and/or storage circuit component(s) 2004 and one or more input/output (I/O) circuit devices 2006. Additionally, the computing device 2000 includes a bus 2008 that allows the various circuit components and devices to communicate with one another. The bus

2008 represents one or more of any of several types of bus structures, including a memory bus or memory controller, a peripheral bus, an accelerated graphics port, and a processor or local bus using any of a variety of bus architectures. The bus 2008 may comprise wired and/or wireless buses.

The processing unit 2002 may be responsible for executing various software programs such as system programs, applications programs, and/or program modules/blocks to provide computing and processing operations for the computing device 2000. The processing unit 2002 may be responsible for performing various voice and data communications operations for the computing device 2000 such as transmitting and receiving voice and data information over one or more wired or wireless communications channels. Although the processing unit 2002 of the computing device 2000 is shown in the context of a single processor architecture, it may be appreciated that the computing device 2000 may use any suitable processor architecture and/or any suitable number of processors in accordance with the described embodiments. In one embodiment, the processing unit 2002 may be implemented using a single integrated processor.

The processing unit 2002 may be implemented as a host central processing unit (CPU) using any suitable processor circuit or logic device (circuit), such as a as a general purpose processor. The processing unit 2002 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 2002 may be coupled to the memory and/or storage component(s) 2004 through the bus 2008. The bus 2008 may comprise any suitable interface and/or bus architecture for allowing the processing unit 2002 to access the memory and/or storage component(s) 2004. Although the memory and/or storage component(s) 2004 may be shown as being separate from the processing unit 2002 for purposes of illustration, it is worthy to note that in various embodiments some portion or the entire memory and/or storage component(s) 2004 may be included on the same integrated circuit as the processing unit 2002. Alternatively, some portion or the entire memory and/or storage component(s) 2004 may be disposed on an integrated circuit or other medium (e.g., hard disk drive) external to the integrated circuit of the processing unit 2002. In various embodiments, the computing device 2000 may comprise an expansion slot to support a multimedia and/or memory card, for example.

The memory and/or storage component(s) 2004 represent one or more computer-readable media. The memory and/or storage component(s) 2004 may be implemented using any computer-readable media capable of storing data such as volatile or non-volatile memory, removable or non-removable memory, erasable or non-erasable memory, writeable or re-writeable memory, and so forth. The memory and/or storage component(s) 2004 may comprise volatile media (e.g., random access memory (RAM)) and/or nonvolatile media (e.g., read only memory (ROM), Flash memory, optical disks, magnetic disks and the like). The memory and/or storage component(s) 2004 may comprise fixed media (e.g., RAM, ROM, a fixed hard drive, etc.) as well as removable media (e.g., a Flash memory drive, a removable hard drive, an optical disk). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 2006 allow a user to enter commands and information to the computing device 2000, and also allow information to be presented to the user and/or other components or devices. Examples of input devices include data ports, analog to digital converters (ADCs), digital to analog converters (DACs), a keyboard, a cursor control device (e.g., a mouse), a microphone, a scanner and the like. Examples of output devices include data ports, ADC's, DAC's, a display device (e.g., a monitor or projector, speakers, a printer, a network card). The computing device 2000 may comprise an alphanumeric keypad coupled to the processing unit 2002. The keypad may comprise, for example, a QWERTY key layout and an integrated number dial pad. The computing device 2000 may comprise a display coupled to the processing unit 2002. The display may comprise any suitable visual interface for displaying content to a user of the computing device 2000. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 2002 may be arranged to provide processing or computing resources to the computing device 2000. For example, the processing unit 2002 may be responsible for executing various software programs including system programs such as operating system (OS) and application programs. System programs generally may assist in the running of the computing device 2000 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, or other suitable OS in accordance with the described embodiments. The computing device 2000 may comprise other system programs such as device drivers, programming tools, utility programs, software libraries, application programming interfaces (APIs), and so forth.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

It should be understood that various changes and modifications to the presently preferred embodiments described herein will be apparent to those skilled in the art. Such changes and modifications can be made without departing from the spirit and scope of the present subject matter and The invention is claimed as follows:

1. A system for processing a composite signal comprised of multiple independent data streams that at least partially overlap in bandwidth, to increase communication throughput, the system comprising:
   at least one programmable circuit that is programmed to:
   receive a priori data describing modulation characteristics of at least one of the multiple independent data streams;
   receive the composite signal;
   execute a channel estimator, wherein the channel estimator uses the a priori data describing the modulation characteristics of the at least one of the multiple independent data streams and performs measurements to dynamically determine channel parameters of the at least one of the multiple independent data streams; and
   apply a signal separation algorithm to the composite signal to derive the at least one of the multiple independent data streams, wherein the signal separation algorithm receives as input the a priori data and the channel parameters.

2. The system of claim 1, wherein the at least one programmable circuit is programmed to execute a performance monitor to evaluate performance of the signal separation.

3. The system of claim 1, wherein the a priori data describes modulation characteristics of each of the multiple independent data streams, and the channel estimator uses the a priori data and performs measurements to dynamically determine channel parameters of each of the multiple independent data streams, the at least one programmable circuit is programmed to:
   apply the signal separation algorithm to the composite signal to derive each of the multiple independent data streams, wherein the signal separation algorithm receives as input the a priori data.

4. The system of claim 1, wherein at least one of a signal amplitude, a carrier frequency, a bit timing and a code phase of the at least one of the multiple independent data streams is offset from a corresponding property of another one of the multiple independent data streams.

5. The system of claim 1, wherein the a priori data describing at least one of the multiple independent data streams includes at least one of a modulation format, a code rate, a bit rate, a pulse shape, an error correction code, an interleaver description, a preamble description, a nominal carrier rate, and a nominal data rate of the at least one of the multiple independent data streams.

6. The system of claim 1, wherein the channel parameters of the at least one of the multiple independent data streams is at least one of a carrier frequency, a carrier phase, a code phase, a bit timing and a data rate refinement.

7. The system of claim 3 wherein the at least one programmable circuit is programmed to execute a performance monitor to evaluate performance of the signal separation.

8. The system of claim 1, wherein the channel estimator dynamically tracks whether the channel parameters of the at least one of the multiple independent data streams changes value.

9. The system of claim 1, wherein the at least one programmable circuit is programmed to, prior to applying the signal separation algorithm:
   demodulate the composite signal; and
   convert the composite signal from analog to digital.

10. The system of claim 1, wherein the at least one programmable circuit is programmed to apply at least one of an error correction encoding technique and an interleaving technique to the at least one of the multiple independent data streams to reduce signal power and to correct bit errors.

11. The system of claim 1, wherein the at least one programmable circuit comprises a programmable circuit selected from the group consisting of a processor, a programmable gate array, and an application specific integrated circuit.

12. The system of claim 1, wherein the signal separation algorithm is selected from the group consisting of a joint maximum likelihood algorithm, an independent component analysis algorithm, a maximum a posteriori—turbo equalizer algorithm, and a maximum a posteriori—matched filter algorithm.

13. The system of claim 1, wherein the signal separation algorithm comprises a maximum a posteriori—turbo equalizer algorithm, the system further comprising:
   an analog-to-digital converter configured to receive the composite signal and convert the composite signal to digital, wherein the analog-to-digital converter is configured to sample the composite signal at a rate greater than twice the baseband frequency and provide as output an oversampled composite signal;
   a trellis equalizer programmed to receive as input the oversampled composite signal and the channel parameters of the at least one of the multiple independent data streams and generate a trellis equalizer output; and
   at least one soft in-soft out (SISO) decoder programmed to receive the first trellis equalizer output and generate as output the at least one of the multiple independent data streams.

14. The system of claim 1, wherein the signal separation algorithm comprises a maximum a posteriori—matched filter algorithm, the system further comprising:
   a matched filter programmed to receive as input the channel parameters of the at least one of the multiple independent data streams and generate as output a first and a second matched filter output; and
   a trellis equalizer programmed to receive as input the first and second matched filter outputs and the channel parameters of the at least one of the multiple independent data streams and generate as output a trellis equalizer output; and
   at least one soft in-soft out (SISO) decoder programmed to receive the trellis equalizer output and generate as output the at least one of the multiple independent data streams.

15. The system of claim 14, wherein the matched filter is implemented digitally.

16. The system of claim 13, wherein a performance monitor evaluates the performance of the signal separation considering at least one of the trellis equalizer output, the output of the at least one SISO decoder, and the channel parameters.

17. The system of claim 14, wherein a performance monitor evaluates the performance of the signal separation considering at least one of the trellis equalizer output, the output of the at least one SISO decoder, and the channel parameters.

18. The system of claim 1, wherein the signal separation algorithm comprises an independent component analysis (ICA) algorithm, the system further comprising:
   a matched filter programmed to receive as input the channel parameter of the at least one of the multiple independent data streams and generate as output a first and a second matched filter output, wherein the ICA algorithm receives as input the first and second matched filter outputs and generates an ICA output; and a forward error correction decoder programmed to receive as input the first ICA output and generate as output the at least one of the multiple independent data streams.

19. The system of claim 1, wherein the signal separation algorithm comprises a joint maximum likelihood algorithm.

20. The system of claim 1, further comprising:
a first transmitter at a first physical location programmed to transmit at least one of the multiple independent data streams at a common bandwidth; and
a second transmitter at a second physical location programmed to transmit another one of the multiple independent data streams at the common bandwidth.

21. A system for processing a composite signal having a first data stream and a second data stream that at least partially overlap in bandwidth, and for increasing communication throughput, the system comprising:
a horizontally polarized receiver programmed to receive the composite signal and generate as output a first modified composite signal;
a vertically polarized receiver programmed to receive the composite signal and generate as output a second modified composite signal;
a computer device having a processor and operatively associated non-transitory data storage, wherein the computer device is in communication with the horizontally polarized receiver and the vertically polarized receiver, wherein the data storage comprises instructions that, when executed by the processor, causes the computer device to:
receive a priori data describing at least one of the first data stream and the second data stream;
receive the first modified composite signal from the horizontally polarized receiver and the second modified composite signal from the vertically polarized receiver;
apply a two-signal separation algorithm to the first and second composite signals to derive the first and second data streams, wherein the two-signal separation algorithm receives as input the a priori data and exchanges the a priori data between the two-signal algorithm to separate the first and second data streams;
execute a performance monitor to evaluate the performance of the signal separation.

22. A system for processing a composite signal having a plurality of data streams that at least partially overlap in bandwidth, and for increasing communication throughput, the system comprising:
a computer device having a processor and operatively associated non-transitory data storage, wherein the data storage comprises instructions that, when executed by the processor, causes the computer device to:
receive a priori data describing the plurality of data streams;
receive the composite signal;
execute a channel estimator, wherein the channel estimator is programmed to calculate at least one channel parameter of each of the plurality of data streams considering the a priori data;
apply at least one signal separation algorithm to the composite signal to derive each of the plurality of data streams, wherein the at least one signal separation algorithm receives as input the at least one channel parameter of each of the plurality of data streams; and
execute a performance monitor to evaluate the performance of the signal separation.

23. A computer-implemented method for processing a composite signal comprising a first data stream and a second data stream that at least partially overlap in bandwidth, and for increasing the communication throughput, the method comprising:
receiving, by a computer device, a priori data describing at least one of the first data stream and the second data stream, wherein the computer device comprises at least one processor and an operatively associated non-transitory data storage device;
receiving, by the computer device, the composite signal;
calculating, by the computer device, at least one parameter of the first data stream considering the a priori data; and
applying, by the computer device, a signal separation algorithm to the composite signal to derive the first data stream, wherein the signal separation algorithm receives as input the at least one parameter of the first data stream; and
evaluating, by the computer device, the performance of the signal separation.

24. The method of claim 23, further comprising:
evaluating, by the computer device, the power level consistency of the first data stream.

25. The method of claim 23, further comprising:
monitoring, by the computer device, an input of at least one decoder;
determining, by the computer device, whether a codeword results; and
continue monitoring the input of at least one decoder to determine whether the codeword results at least twice in succession.

26. The system of claim 1, wherein the signal separation algorithm is one of a plurality of signal separation algorithms and the at least one programmable circuit is programmed to select and apply one of the plurality of signal separation algorithms to the composite signal considering the a priori data and the channel parameters.

* * * * *